(12) United States Patent
Tarr et al.

(10) Patent No.: US 7,571,110 B2
(45) Date of Patent: Aug. 4, 2009

(54) AUTOMATED COMPENSATION REPORTS USING ONLINE SURVEYS AND COLLABORATIVE FILTERING

(75) Inventors: Douglas Tarr, New York, NY (US); Joseph Giordano, III, Bellevue, WA (US)

(73) Assignee: Payscale, Inc., Bellevue, WA (US)

( * ) Notice: Subject to any disclaimer, the term of this patent is extended or adjusted under 35 U.S.C. 154(b) by 0 days.

(21) Appl. No.: 10/748,968

(22) Filed: Dec. 29, 2003

(65) Prior Publication Data

US 2004/0210820 A1 Oct. 21, 2004

Related U.S. Application Data

(60) Provisional application No. 60/436,809, filed on Dec. 27, 2002.

(51) Int. Cl.
 *G06F 17/30* (2006.01)
(52) U.S. Cl. ...................................................... 705/10
(58) Field of Classification Search .................. 705/10, 705/11, 14
 See application file for complete search history.

(56) References Cited

U.S. PATENT DOCUMENTS

| | | | | |
|---|---|---|---|---|
| 6,064,980 | A * | 5/2000 | Jacobi et al. ................... | 705/26 |
| 6,477,504 | B1 * | 11/2002 | Hamlin et al. ................. | 705/10 |
| 6,587,832 | B1 * | 7/2003 | Beck et al. ..................... | 705/9 |
| 6,618,734 | B1 * | 9/2003 | Williams et al. ......... | 707/104.1 |
| 6,701,322 | B1 * | 3/2004 | Green .......................... | 707/102 |
| 6,862,596 | B2 * | 3/2005 | Thomsen ...................... | 707/10 |
| 7,376,569 | B2 * | 5/2008 | Plunkett et al. ................ | 705/1 |
| 2001/0044739 | A1 * | 11/2001 | Bensemana ................... | 705/10 |
| 2002/0002479 | A1 * | 1/2002 | Almog et al. .................. | 705/8 |
| 2002/0002482 | A1 * | 1/2002 | Thomas ........................ | 705/10 |
| 2002/0133502 | A1 * | 9/2002 | Rosenthal et al. ......... | 707/104.1 |
| 2002/0188489 | A1 * | 12/2002 | Cheng et al. .................... | 705/8 |
| 2003/0004748 | A1 * | 1/2003 | Coleman et al. ................ | 705/1 |
| 2003/0046140 | A1 * | 3/2003 | Callahan et al. ............... | 705/10 |
| 2003/0083921 | A1 * | 5/2003 | Clark et al. ..................... | 705/8 |
| 2003/0145015 | A1 * | 7/2003 | Turnasella ............... | 707/104.1 |
| 2003/0187725 | A1 | 10/2003 | Jotkowitz | |
| 2003/0204439 | A1 * | 10/2003 | Cullen, III ................... | 705/11 |
| 2004/0107112 | A1 * | 6/2004 | Cotter ........................... | 705/1 |

OTHER PUBLICATIONS

"Market Based Compensation System", compensate.com, May 5, 2001 [retrieved May 13, 2004], pp. 1-3, retrieved from: archove.org and google.com.*

"Compensate.com Industry Surveys", compensate.com, Feb. 20, 1999 [retrieved May 13, 2004], pp. 1-7, retrieved from: Google.com and archive.org.*

Compensate.com, San Francisco Production Group, Feb. 4, 1998 [retrieved May 13, 2004], pp. 1-7, retrieved from: Google.com and archive.org.*

MarketPay Associates, MarketPay.com, Jul. 31, 2002 [retrieved Oct. 14, 2004], pp. 1-23, retrieved from google.com and archive.org.*

Northrop, John, Getting the Best from Salary Surveys Health Manpower Management, vol. 18, No. 1, 1992.*

(Continued)

*Primary Examiner*—Scott L Jarrett
(74) *Attorney, Agent, or Firm*—Michael A. Glenn; Glenn Patent Group

(57) ABSTRACT

A method and apparatus for providing targeted online compensation reports that accounts for unique individual job characteristics by using dynamic profiles is described. The invention uses a survey engine having a collaborative filtering engine that determines appropriate questions to ask the user during the survey, and may further provide suggested possible answers. A collection of user profiles is used for comparison purposes and to produce additional individualized compensation reports.

36 Claims, 59 Drawing Sheets

OTHER PUBLICATIONS

Law, Kenneth S, Pay Grade Determination Using Cluster Analysis Asia Pacific Journal of Human Resources, vol. 33, No. 2, Winter 1995.*

Weinberger, Theodore E., Pare-to-peer WorldatWork Journal, vol. 9, No. 2, Second Quarter 2000.*

How reliable are online salary data? IOMA's Report on Compensation & Benefits for Law Offices, vol. 1, No. 10, Oct. 2001.*

Salary.Com; http://192.168.15:9988/salarytrax/layoutscripts/stxl_reg.asp?msg=1.

Salary.Com; http://192.168.15:9988/salarytrax/layoutscripts/stxl_home.asp.

Salary.Com; http://192.168.15:9988/salarytrax/paypak/layoutscripts/ppkl_result.asp.

Salary.Com; http://192.168.15:9988/SalaryTrax/PerformanceGauge/layoutscripts/pfgl_start.asp.

Salary.Com; http://192.168.15:9988/salarytrax/layoutscripts/pfgl_customize.asp.

Salary.Com; http://192.168.15:9988/salarytrax/layoutscripts/pfgl_rating.asp?trai....

Salary.Com; http://192.168.15:9988/salarytrax/layoutscripts/pfgl_result.asp?aval....

Salary.Com; http://192.168.15:9988/salarytrax/layoutscripts/pfgl_step.asp?stepi....

Salary.Com; http://192.168.15:9988/salarytrax/layoutscripts/stxl_reg.asp?upd=1.

Functional Specification for Salary Reporter undated.

Screenshots of Compensate.com (www.compensate.com) Feb. 4, 1998, pp. 1-7.

Screenshots of Compensate.com (www.compensate.com) Feb. 2, 1999, pp. 2 and 4.

Screenshots of Compensate.com (www.compensate.com) May 5, 2001, pp. 1-3.

Screenshots of Compensate.com (www.compensate.com) pp. 1-3.

* cited by examiner

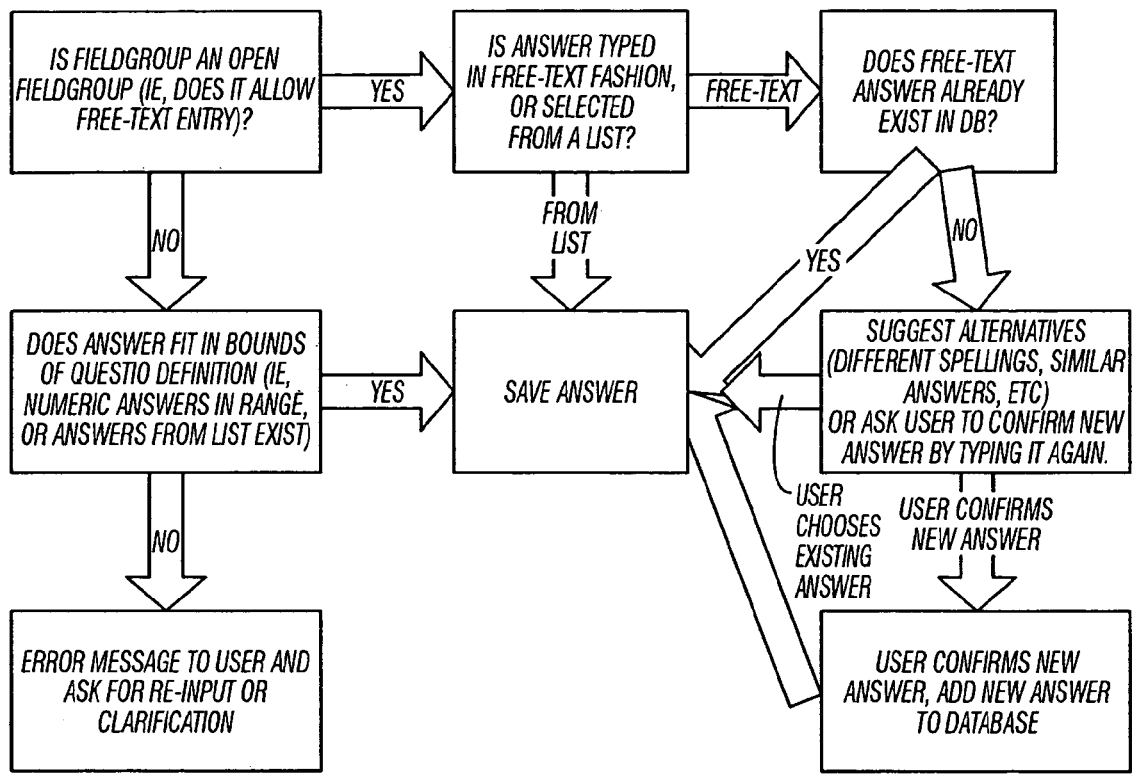

FIG. 5

| INDUSTRY | | LAW |
|---|---|---|
| JOB | TITLE | LAWYER |
| JOB | YEARS EXPERIENCE | 5 |
| SALARY | AMOUNT | $72,000 |
| SALARY | CURRENCY | USD |
| SALARY | WORK WEEK | 40 HOURS |
| LOCATION | CITY | SAN DIEGO |
| LOCATION | STATE | CA |
| LOCATION | COUNTRY | USA |
| BAR ASSOCIATION | | CA BAR ASSOCIATION |
| BAR ASSOCIATION | | US BAR ASSOCIATION |
| SCHOOL | NAME | HARVARD UNIVERSITY |
| SCHOOL | DEGREE | B.A. |
| SCHOOL | YEAR GRADUATED | 1994 |
| SCHOOL | NAME | GEORGETOWN UNIVERSITY |
| SCHOOL | DEGREE | JD |
| SCHOOL | YEAR GRADUATED | 1998 |
| BENEFITS | | CORNER OFFICE |
| BENEFITS | | FREE COFFEE |
| BENEFITS | | HEALTH PLAN |
| BONUS | AMOUNT | $10,000 |
| BONUS | CURRENCY | USD |
| BONUS | PERIOD | YEARLY |

FIG. 6

*A SERIES OF EXAMPLE RULES USED IN THE RULES ENGINE*

*RULES ARE AMENDED FROM TIME TO TIME AS NEEDED FOR THE SYSTEM TO PROCESS PROFILES IN THE MOST EFFICIENT AND ACCURATE WAY. THESE ARE EXAMPLES. ONE SKILLED IN THE ART WILL EASILY UNDERSTAND THAT OTHER RULES MAY BE EMPLOYED.*

1. IF ANY ANSWER EXISTS FOR THE FIELD DEGREE, AND THE PROFILE ALSO CONTAINS CERTIFICATION="DEGREE" AND/OR CERTIFICATION="DIPLOMA IN INFORMATION TECHNOLOGY", THEN REMOVE THOSE VALUE(S) FOR CERTIFICATION.
2. IF AN ANSWER FOR BENEFITS/PERKS="MEDICAL/DENTAL/VISION/HEALTH INSURANCE" EXISTS AND PROFILE ALSO CONTAINS BENEFITS/PERKS="DENTAL INSURANCE" AND/OR BENEFITS/PERKS="HEALTH INSURANCE" THEN REMOVE THOSE LATTER VALUE(S) FOR BENEFITS/PERKS.
3. IF ANY CURRENCY <> "US - DOLLARS" THEN FLAG THE PROFILE FOR REVIEW. (THIS RULE TO BE REMOVED AT A LATER TIME WHEN THE SYSTEM HAS GAINED CERTAIN LEVELS OF COMFORT WITH NON-US PROFILES).
4. IF PROFILE DOES NOT CONTAIN AN ANSWER FOR SALARY OR HOURLY RATE, THEN FLAG THE PROFILE FOR REVIEW.
5. IF PROFILE CONTAINS ANY NON-ZERO VALUE FOR SALARY OR HOURLY RATE, AND ALSO CONTAINS ANSWERS FOR THE FIELDGROUPS PROFIT SHARE, MONTHLY ROYALTY, OR DAILY INCOME WITH THE VALUES OF 0, THEN REMOVE THE FIELDGROUP(S) FOR THOSE THAT CONTAIN VALUES OF 0.
6. IF PROFILE CONTAINS A ZERO VALUE FOR ALL COMPENSATION QUESTIONS IN THE PROFILE, THEN DEACTIVATE THE PROFILE.
7. IF THE CURRENCY FIELD DOES NOT MATCH FOR ALL COMPENSATION QUESTIONS IN THE PROFILE, THEN FLAG THE PROFILE FOR REVIEW.
8. IF ANY FIELD EXCEPT THE JOB FIELD CONTAINS "N/A" OR "NONE" THEN GLOBAL REMOVE THE VALUE. IF THE FIELD WAS FOR JOB, THEN FLAG THE PROFILE FOR REVIEW.
9. PROFILES SHOULD ALSO BE MARKED FOR REVIEW IF THEY CONTAIN A NUMBER OF ANSWERS TO FIELDS ACCORDING TO THIS TABLE:

FIELD BENEFITS/PERKS...IF>=8 ANSWER VALUES IN PROFILE
FIELD JOB...IF>=4 ANSWER VALUES IN PROFILE
FIELD PRIMARY RESPONSIBILITIES...IF>=8 ANSWER VALUES IN PROFILE
SKILL...IF>=8 VALUES
INDUSTRY... IF>=5 VALUES
OTHER FIELDS ARE OK TO PASS THROUGH.

10. IF THERE IS NO VALUE FOR COUNTRY BUT THERE IS A NON-ZERO VALUE FOR SALARY OR HOURLY RATE WITH CURRENCY="US - DOLLARS", AND THERE IS A VALUE FOR JOB, AND THE EMAIL ADDRESS DOES NOT END IN ".CA", ".BR", ".HK", ETC, THEN ADD COUNTRY ="UNITED STATES" TO THE PROFILE.
11. IF CURRENCY=US AND SALARY IS < $8000 THEN MARK FOR REVIEW. IF HOURLY RATE > 350, OR < 5 US DOLLARS, ALSO MARK FOR REVIEW. DO THIS SIMILAR RULE AGAIN FOR OTHER CURRENCIES AND SALARY/HOURLY RATE RANGES.
12. IF ANY OF THE FOLLOWING "RARE" FIELDGROUPS EXIST IN A PROFILE (POSITION, TENURED, RUNS BATTED IN, ETC), THEN FLAG THE PROFILE FOR REVIEW.
13. IF THERE IS NO EMPLOYER NAME BUT THERE IS A VALUE FOR PRODUCTACTIVITY, THEN REMOVE ANY AND ALL PRODUCTACTIVITY ANSWERS FROM THE PROFILE, BUT ONLY DO IT IF THERE IS NO OTHER REASON FOR THE PROFILE TO BE FLAGGED FOR REVIEW FROM OTHER RULES.
14. IF THERE ARE NO COMPENSATION ANSWERS AT ALL, THEN DEACTIVATE PROFILE.

*FIG. 19*

15. IF EMAIL NAME CONTAINS FUNNY WORDS LIKE "NEEDAJOB" OR "JOHNDOE" OR "ASDF" OR "QWERTY", OR "TEST", ETC, THEN FLAG PROFILE FOR REVIEW.
16. IF EITHER OF THE CITY OR STATE FIELDS IS THE SAME AS A KNOWN COUNTRY NAME, BUT THE PROFILE'S ANSWER FOR COUNTRY IS NOT THE SAME AS THE PROFILE'S ANSWER FOR CITY AND/OR STATE, THEN FLAG THE PROFILE FOR REVIEW.
17. THE NO-ANSWERS RULE INACTIVATES AND MARKS A PROFILE REVIEWED IF THERE ARE NO ANSWERS AT ALL IN THE PROFILE. ALSO, IF THERE ARE ONLY INDUSTRY FIELDGROUPS ANSWERED (EITHER CONFIRMED OR UN-CONFIRMED) AND NO OTHER TYPES OF FIELDGROUPS ANSWERED, THEN ALSO INACTIVATE AND MARK IT REVIEWED.
18. IF THE EMPLOYER NAME IS LIKE "PAYSCALE" OR "PRIVATE" OR "NONE OF YOUR BUSINESS", ETC, THEN DEACTIVATE PROFILE.
19. IF THE EMAIL NAME CONTAINS "UNDERPAID.COM", "PAYSCALE.COM", (INTERNAL TEST EMAIL ADDRESSES) THEN DEACTIVATE THE PROFILE.
20. IF THERE IS MORE THAN 1 ANSWER FOR BENEFITS/PERKS, BUT ONE OF THEM IS "NONE (CONTRACT-BASED)", THEN THE ANSWER "NONE (CONTRACT-BASED)" SHOULD BE REMOVED FROM THE PROFILE.
21. IF BOTH JOB = "SR. SOFTWARE ENGINEER / DEVELOPER / PROGRAMMER" AND JOB = "SOFTWARE ENGINEER / DEVELOPER / PROGRAMMER" IN THE PROFILE, THEN REMOVE THE LATTER ONE FROM THE PROFILE. IF BOTH JOB = "CONSULTANT, IT" AND JOB = "CONSULTANT" ALSO IN THE PROFILE, THEN REMOVE THE LATTER ONE. IF BOTH JOB = "SENIOR DATABASE ADMINISTRATOR (DBA)" AND JOB = "DATABASE ADMINISTRATOR (DBA)" THEN REMOVE THE LATTER ONE.
22. IF YEARS IN FIELD = 0, AND THE PROFILE'S EMPLOYMENT STATUS / SEARCH GOAL IS NOT "STUDENT/EVALUATING JOB OFFER", THEN MARK PROFILE FOR REVIEW.
23. IF A PROFILE HAS AN UNCONFIRMED (NEW) VALUE FOR CERTIFICATION, AND THERE IS NO DEGREE ANSWERED IN THE PROFILE, THEN IF THE NEW ANSWER FOR CERTIFICATION IS ALREADY AN EXACT MATCH OF AN EXISTING VALUE FOR THE "DEGREE" FIELD, REMOVE THE UNCONFIRMED CERTIFICATION FROM THE PROFILE AND ADD THE KNOWN DEGREE INSTEAD.
24. PROFILES WITH THESE JOB COMBINATIONS SHOULD BE MARKED FOR REVIEW: (ASSOCIATE ATTORNEY OR ENTRY-LEVEL ATTORNEY) AND (GENERAL COUNSEL OR PARTNER - LAW FIRM).
25. CHECK/APPLY ALL ABOVE RULES TO THE PROFILE FIRST. IF THERE IS NO REASON FOR THE PROFILE TO BE DEACTIVATED OR FLAGGED FOR REVIEW, BUT IF A PROFILE HAS NO SMART REPORT YET AND THERE IS A VALUE FOR JOB THAT WOULD SUCCEED IF THE SMART REPORT WAS RUN, THEN AUTOMATICALLY ORDER AND DELIVER A SMART REPORT FOR THIS PROFILE.
26. CHECK/APPLY ALL ABOVE RULES TO THE PROFILE FIRST. IF THERE IS NO REASON FOR THE PROFILE TO BE DEACTIVATED OR FLAGGED FOR REVIEW, AND IF THERE IS A VALUE FOR COUNTRY, A NON-ZERO VALUE FOR SALARY OR HOURLY RATE, AND VALUE FOR JOB THAT WOULD SUCCEED THE SMART REPORT WHEN RUN (OR IF THE LAST SMART REPORT IS KNOWN TO HAVE SUCCEEDED), THEN ACTIVATE THE PROFILE.

*FIG. 19*
*(Continued)*

PayScale  SS1

Home | Your Profile | Alerts | Research | Login

*The best analysis available comparing your job profile to the salary and compensation packages of people whose skills and experiences match yours.*

Get The Payscale Report!

— Preparing for a salary negotiation?
— Contemplating a career or job change?
— Thinking of moving to a new city?
— Looking for peace of mind?

Start by selecting one of the following:

- ⊙ Currently employed, seeking information
- ○ Not Employed, seeking information
- ○ Evaluating specific job offer or raise

Login Information:

E-mail Address: [_____]   (Existing user login)
*(Must be a valid email address your privacy is assured.)*

Password: [_____]

Confirm Password: [_____]

☐ ← Check here if you agree to the Terms of Service.

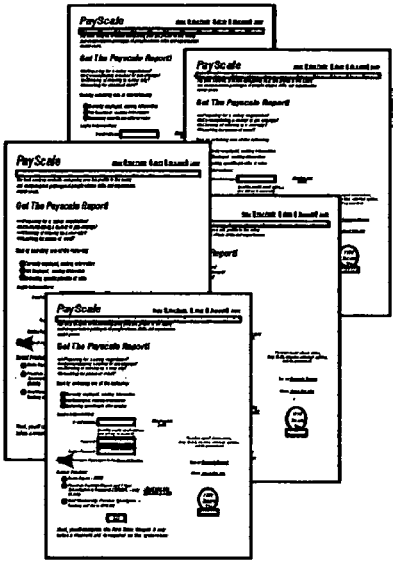

Premium report shown above, Only $9.95, inlcudes unlimited updates, and it's guaranteed.

See an Example Report

More about this site

Select Product:
- ○ Basic Report - FREE!
- ⊙ Premium Payscale Report and 1 Year Subscription to Research (SPECIAL - only $9.95!)  — Read why this selection is best!
- ○ Gold Membership: Premium Subscription + Tracking and Alerts ($19.95)

[ GO ]

*Next, you'll complete the First Time Wizard. It only takes a moment and is required so the system can*

FIG. 20

PayScale! SS2

Home | Your Profile | Alerts | Research | Logout

Build Your Profile

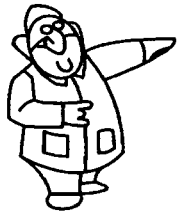

Answer these questions to create your Payscale Report. Be honest otherwise your report will not work!

Profile meter:

This profile is 0% complete. At %100 we will show you how you compare.

Question: Industry

About this question: Industry is the type of work or profession you are in.

○ SELECT YOUR PRIMARY INDUSTRY. YOU MAY CHOOSE MORE THAN ONE IF NEEDED: (Part 1 of 1)

Type answer: [　　　　　　　　　]

Or choose from popular answers:
- ☐ IT -- Computer, Software
- ☐ IT -- Computer, Hardware / Systems
- ☐ IT -- Networking
- ☐ Administrative, Support, and Clerical
- ☐ Finance / Accounting
- ☐ Healthcare - Services
- ☐ Legal Services, Legislature, Law
- ☐ Engineering
- ☐ Manufacturing
- ☐ Internet and New Media
- ☐ Consulting Services
- ☐ Human Resources
- ☐ Retail
- ☐ Telecommunications
- ☐ E-Commerce More...

[Answer] [Clear]

If this question is not relevant to your job profile, you can [Skip] it.

🔒 Security Notice: Your Privacy is important. Only the computer system uses your information to make comparisons as a service to you.

FIG. 21

PayScale! SS3     Home | Your Profile | Alerts | Research | Logout

| More Answers |

Here are More Answers for Industry...

Choose below, or search to find your answer: [        ] |GO|

INDUSTRIES:     Browse: A B C D E F G H I J K L M N O P Q R S T U V W X Y Z # All

(A)
- ☐ a4
- ☐ Account Management
- ☐ accounts payable
- ☐ Acupuncture
- ☐ Adhesives & Sealants
- ☐ Administrative, Support, and Clerical
- ☐ Admissions Representative
- ☐ Advertising
- ☐ Aerospace Systems
- ☐ Aerospace, Aeronautics, Astronautics, Defense
- ☐ Aggregate Equipment
- ☐ Agriculture
- ☐ Agriculture, Forestry, Fishing
- ☐ Air Courier (Transportation)
- ☐ Air Traffic Controller
- ☐ Anesthesiologist
- ☐ Apparel / Accessories
- ☐ Appliance & tool (Consumer Cyclical)
- ☐ Archaeology
- ☐ Architectural Millwork
- ☐ Architecture
- ☐ Art Education / Museums
- ☐ art historian gallery sales
- ☐ Arts and Entertainment
- ☐ Arts Information and box office
- ☐ AS/400 Computer Operator
- ☐ attorney
- ☐ Audio & Video Equipment

*FIG. 22*

PayScale! SS4    Home | Your Profile | Alerts | Research | Logout

Confirm Answers

Please CONFIRM Your Answer for Industry...
You answered: "Zoomba"

Confirm your original answer by typing it again:

Your Answwer:    [ Zoomba ]

Confirm Answer:    [ Zoomba ]

Note: Use proper spelling, correct upper/lower case letters, and complete answers.

[ Continue ]   [ Cancel ]

🔒 Security Notice: Your Privacy is important. Only the computer system uses your information to make comparisons as a service to you.

© 2001-2002 PayScale, Inc. *Affiliate Program*   *Privacy Policy*   *Terms of Use*   *About.*

Patents Pending. PayScale, The PayScale Report and People Like You are Trademarks of PayScale, Inc.

*FIG. 23*

PayScale! SS5

Home | Your Profile | Alerts | Research | Logout

| Please select from the following choices |

 Please select questions that fit most appropriately for you.

Compensation

Check each form of compensation that you receive, and then choose the finished button.  [ Finished ]

☐ Salary ☐ Bonus

☐ Hourly Rate ☐ Overtime Rate

☐ Profit/Equity Share ☐ Average Monthly Income

☐ Commission on Sales ☐ Average Daily Income

☐ Monthly Royalties

---

The questions above will be used to compare your compensation with other people who have similar answers. Check the questions that pertain to your profile, and then click one of the Finished buttons.  [ Finished ]

---

🔒 Security Notice: Your Privacy is important. Only the computer system uses your information to make comparisons as a service to you.

© 2001-2002 PayScale, Inc: Affiliate Program | Privacy Policy | Terms of Use | About Patents Pending. PayScale, The PayScale Report and People Like You are Trademarks of PayScale, Inc.

FIG. 24

*PayScale!* SS6

Home | Your Profile | Alerts | Research | Logout

Build Your Profile

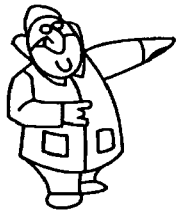

Question: Salary

About this question: Salary is how much you make per year, excluding bonuses and other forms of compensation. Also confirm the currency and whether this is a full-time salary or not. (Be honest, otherwise the system can not provide a correct comparison for you!):

Answer these questions to create your Payscale Report. Be honest otherwise your report will not work!

⊛ENTER YOUR ANNUAL SALARY: _(Part 1 of 3)_

Enter your Annual Salary: [75000]

⊛SELECT CURRENCY: _(Part 2 of 3)_

[US-Dollars ▼]

Profile meter:
[▨▨▨▨▨   ]
This profile is 31% complete. At %100 we will show you how you compare.

⊛SELECT THE STANDARD PAY RATE FOR THIS SALARY: _(Part 3 of 3)_

[Standard Full Time 40+ Hours Per Week ▼]

[ Answer ]   [ Clear ]

If this question is not relevant to your job profile, you can [Skip] it.

---

 Security Notice: Your Privacy is important. Only the computer system uses your information to make comparisons as a service to you.

© 2001-2002 PayScale, Inc: Affiliate Program | Privacy Policy | Terms of Use | About Patents Pending. PayScale, The PayScale Report and People Like You are Trademarks of PayScale, Inc.

*FIG. 25*

Please wait

Your FREE Basic Report is being calculated.

---

Order Your Premium Report on the next page...

Learn what the highest-paid individuals in your job are making and why.

- <u>It could mean thousands of dollars more in wages and benefits</u>

- Where the best place to work are
- Highest valued skills in your field
- Benefits and perks received by your peers
- Which industries pay the most
- Other careers you could do
- Possible "ceiling" due to your age and gender
- See Real Profiles of people like you, and more!

---

(Available for order on the next page...)

FIG. 26

PayScale! SS8

Home | Your Profile | Alerts | Research | Logout

Your Summary Report
Generated on Tuesday, December 10, 2002, for patentapp@douglastarr.com PayScale analyzed the compensation of people with job profiles most similar to yours. Here are the results (figures shown in US - Dollars):

1. The average compensation of your peer group is:

-$12300      $51600      +$12300

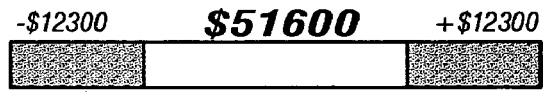

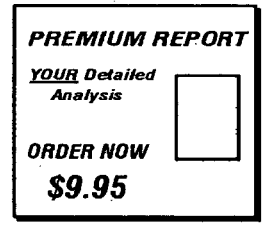

PREMIUM REPORT
*YOUR* Detailed Analysis

ORDER NOW
$9.95

2. Your compensation ranked: 87%   Grade: B+
(A grade of "C" is average.)

Find out:
- ✓ Information to negotiate higher compensation.
- ✓ Employers that pay more.
- ✓ Most valuable skills.
- ✓ Benefits for your job type and experience.
- ✓ Expected increases with experience.
- ✓ Top-paying locations if your are moving.

Guaranteed to inform or money back.

[ Continue→ ]

3. What To Do Next

Compensation is an important aspect of your career. Your PayScale Premium Report provides you information needed to negotiate your job title, compensation, and benefits, more effectively. *It's only $9.95.*

*FIG. 27*

PayScale! SS9

Home | Your Profile | Alerts | Research | Logout

Your Profile

Your profile answers were last updated on 11/6/2002. (Make sure they're up to date!)

Email: @yahoo.com
First Name:
Last Name:
Allow emails: No

[Update Name or Email]

▶ *View your current PayScale Report*

Subscription Status

You are a member since: 11/28/2001 11:17:53 A.M.

Your Answers

Make sure your answers describe your industry, employer, job type, compensation, and other attributes you think are important to analyze. Edit this information as necessary. You can also see a list of *all possible profile questions*.

Profession and Experience

| | | |
|---|---|---|
| Industry .... | IT -- Computer, Hardware / Systems | (Edit) (Delete) |
| Industry .... | IT -- Computer, Software | (Edit) (Delete) |
| Industry .... | IT -- Networking | (Edit) (Delete) |
| Industry .... | Nursing | (Edit) (Delete) |
| Job/Position/Title .... | Computer / Network Support Technician | (Edit) (Delete) |
| Job/Position/Title .... | Sr. Software Engineer / Developer / Programmer | (Edit) (Delete) |
| Years In Field/Career .... | 5 | (Edit) (Delete) |

▶ *Answer more "Profession and Experience" questions...*

Other Key Attributes

| | | |
|---|---|---|
| Skills/Specialties .... | Visual Basic (VB) | (Edit) (Delete) |
| Skills/Specialties .... | Windows NT / 2000 / XP Networking | (Edit) (Delete) |
| Skills/Specialties .... | Zzz Zzz | (Edit) (Delete) |
| Company's Product/Business .... | Computing Solutions - Hardware | (Edit) (Delete) |

▶ *Answer more "Other Key Attributes" questions...*

Compensation

FIG. 28

PayScale! *SS10*  Home | Your Profile | Alerts | Research | Logout

The PayScale Report ™
Generated on Monday, October 14, 2002
For @yahoo.com
Gold Member Report
*Based on an in-depth comparison of the 200 closet matches to*
*People Like You™*

*Your Compensation Comparison*

The following charts compare your compensation package with people in your peer group. You can compare individual elements of your compensation, such as the forms of pay you receive and also your benefits.

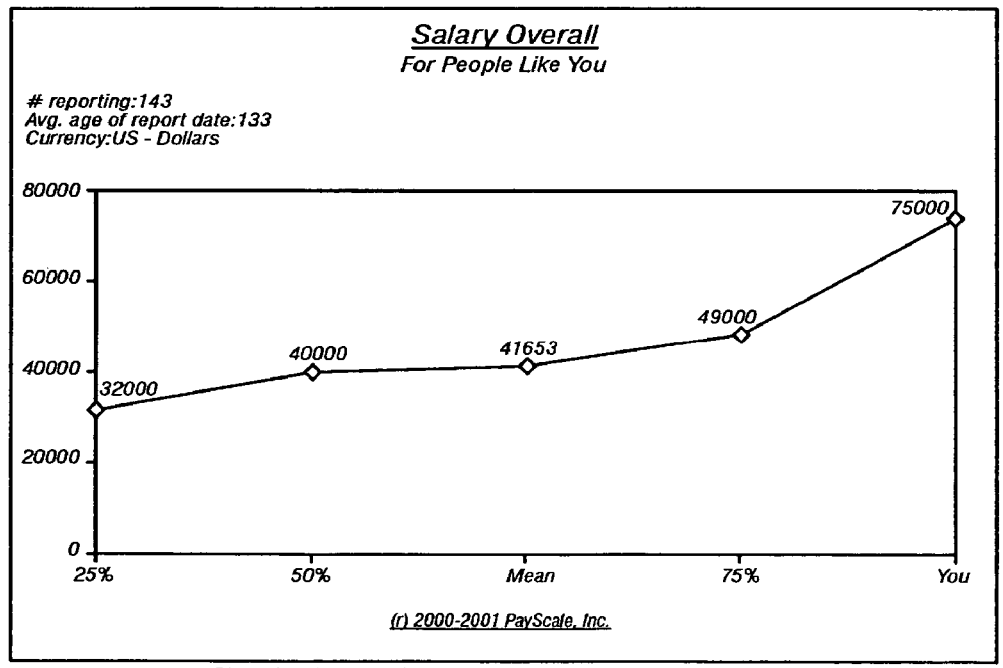

Chart 1a, How your base salary compares to People Like You.

| Measure | How You Compare | Avg. Answer | Your Answer | |
|---|---|---|---|---|
| Average Hourly Rate Overall | You didn't answer | 459 | | Chart 1b. How your hourly pay rate compares to People Like You. |

| Measure | How You Compare | Avg. Answer | Your Answer | |
|---|---|---|---|---|
| Average Bonus Overall | You didn't answer | 2969 | | Chart 1c. How your annual bonus compares to People Like You. |

| Measure | How You Compare | Avg. Answer | Your Answer | |
|---|---|---|---|---|
| Average Profit Disbursement Overall | You didn't answer | 2500 | | Chart 1d. How your profit sharing compares to People Like You. |

| Measure | How You Compare | Avg. Answer | Your Answer | |
|---|---|---|---|---|
| Average Vacation Overall | ☺ | 3 | 3 | Chart 2a. How your paid vacation time compares to People Like You. |

Popular Benefits Overall
For People Like You

\# reporting: 163
Avg age of report date: 127

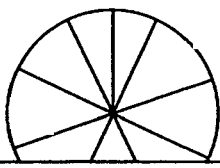

☐ Medical/Dental/Vision/Health Insurance
☐ 401(k)
☐ Casual Dress/Atmosphere
☐ Education/Training/Tuition/Certification Chart 2b. Most popular benefits among People Like You. 82% of people in your peer group have answered this question.

The most popular answers in your peer group are below. Those you do not have are marked with an "X"

✓ Medical/Dental/Vision/Health Insurance
✓ 401(k)
X Casual Dress/Atmosphere

FIG. 31

Key Business Segments          *SS12*

*People like you are generally working in the following popular business segments and/or product activities.*

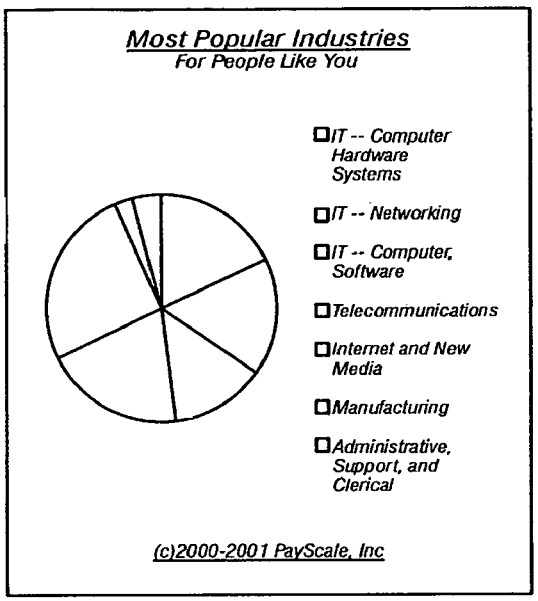

Chart 3a. Top 7 Most Popular Industries.

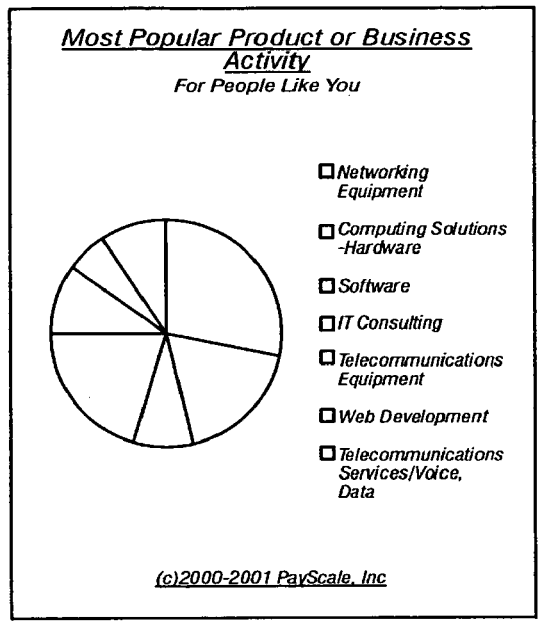

Chart 3b. Top 7 Most Popular Product or Business Activities.

Pay Influencers

*The following reports are an analysis of job attributes (i.e. skills, experience, certifications, specialties, background, etc.) that influence your pay. You will see as many reports as the system can determine based on the profile you entered. From these charts you can see how you are ranked relative to others in your peer group, thus enabling you to determine which factors could increase your market value. Your answers are shown with a grey-colored highlight.*

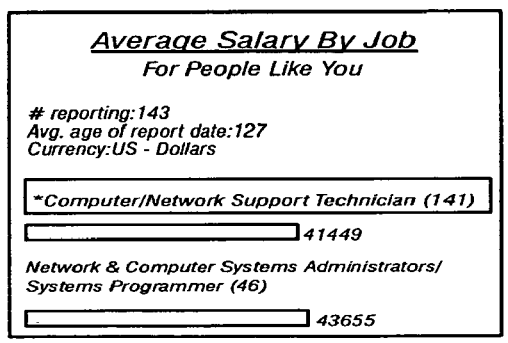

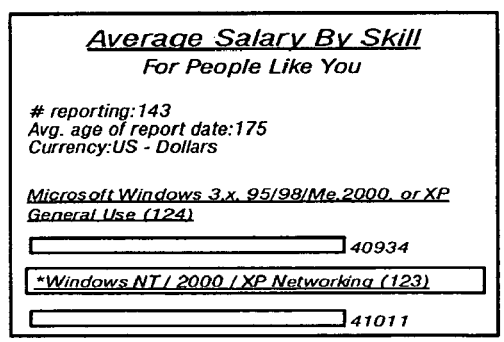

FIG. 32

Geographic Outlook  SS13

*Moving can be exciting - a new outlook, new environment, new opportunities. The following compares the effect that geographic location has on your peer group. From these charts you can see what areas pay the most for your peer group*

*Many factors affect your compensation when moving to a new locale. The most commonly known factor is the standard living. The cost of food, electricity, real estate, rents, gas, etc. can be dramatically different from one location to another if you'd like to compare different standard of living costs, you can consult the most current standard of living tables on the PayScale web site.*

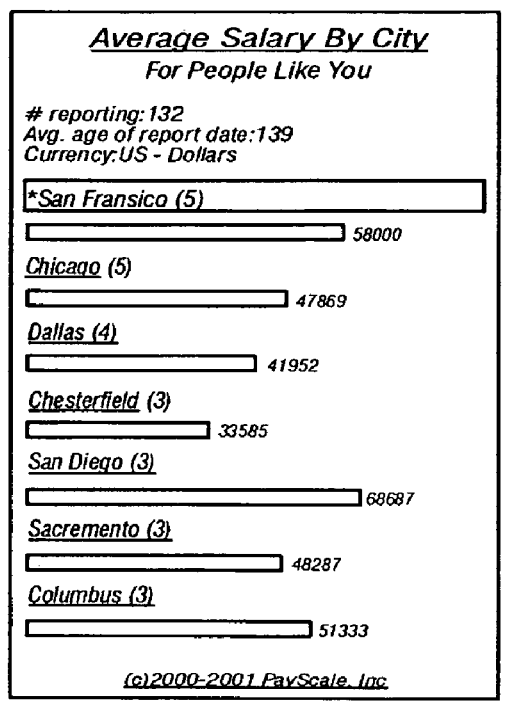

Chart 5a, Top 7 Highest Salary Cities

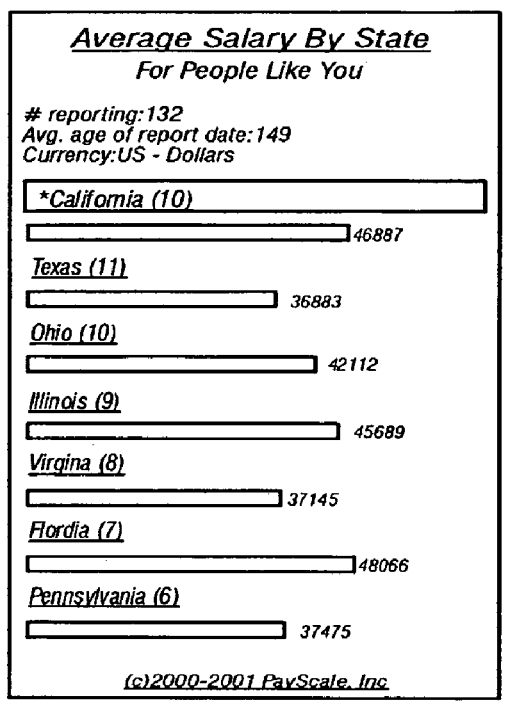

Chart 5b, Top 7 Highest Salary Cities

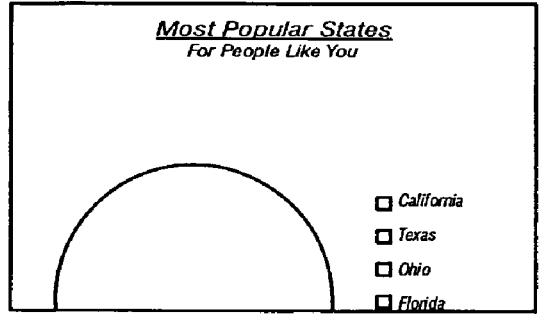

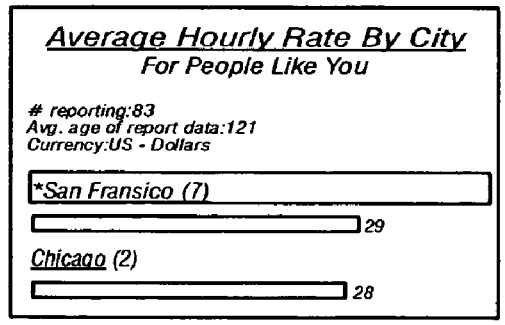

FIG. 33

Peer Profiles  SS14

The following shows up to 10 detailed anonymous profiles of people most like you. You may find it useful to look at these profiles, as they are examples of the raw data used to calculate this report. This information may help you determine why similar people are making more (or less) than you.

| Profile #1 (Great Match: 82) | Source: PayScale Main |
|---|---|
| Reasons we chose this profile: | same or similar job, same or similar industry, same or similar skills, same experience level |
| Industry ... | IT -- Computer, Software (Match!) |
| Industry ... | IT -- Computer, Hardware / Systems (Match!) |
| Industry ... | IT -- Networking (Match!) |
| Current Employer ... | Employer Type: Government - State & Local |
| | Employer Name: This data point withheld for privacy - More info |
| | Years with Employer: 3 |
| Job/Position/Title ... | Sr. Software Engineer / Developer / Programmer (Match!) |
| Job/Position/Title ... | Computer / Network Support Technician (Match!) |
| Job/Position/Title ... | Network & Computer Systems Administrator / Systems Programmer |
| Job/Position/Title ... | Network Engineer |
| Years In Field/Career ... | 5 |
| Years In Field Range ... | 5-9 years (Match!) |
| Skills/Specialties ... | Windows NT / 2000 / XP Networking (Match!) |
| Skills/Specialties ... | Microsoft Windows 3,x, 95/98/Me, 2000, or XP - General Use |
| Skills/Specialties ... | HTML |
| Skills/Specialties ... | Visual Basic (VB) (Match!) |
| Salary ... | 42229 |
| | Currency: US - Dollars |
| | Salary Type: Standard Full-Time 40+ Hours Per Week |
| Vacation Time ... | 2.5 |
| Benefits/Perks ... | Medical/Dental/Vision/Health Insurance |
| Benefits/Perks ... | Casual Dress/Atmosphere |
| Benefits/Perks ... | Flex-Time |
| Benefits/Perks ... | Paid Sick Leave |
| Job Location ... | City: Albany |
| | State or Province: New York |
| | Country: United States |
| Certifications ... | Microsoft Certified Professional (MCP) |
| Profile # 2 (Great Match: 76) | Source: PayScale Main |

FIG. 34

Peer Profiles                    SS14

The following shows up to 10 detailed anonymous profiles of people most like you. You may find it useful to look at these profiles, as they are examples of the raw data used to calculate this report. This information may help you determine why similar people are making more (or less) than you.

| Profile #1(Great Match: 82) | Source: PayScale Main |
|---|---|
| Reasons we chose this profile: | same or similar job, same or similar industry, same or similar skills, same experience level |
| Industry ... | IT -- Computer, Software (Match!) |
| Industry ... | IT -- Computer, Hardware / Systems (Match!) |
| Industry ... | IT -- Networking (Match!) |
| Current Employer ... | Employer Type: Government - State & Local |
| | Employer Name: This data point withheld for privacy - More info |
| | Years with Employer: 3 |
| Job/Position/Title ... | Sr. Software Engineer / Developer / Programmer (Match!) |
| Job/Position/Title ... | Computer / Network Support Technician (Match!) |
| Job/Position/Title ... | Network & Computer Systems Administrator / Systems Programmer |
| Job/Position/Title ... | Network Engineer |
| Years In Field/Career ... | 5 |
| Years In Field Range ... | 5-9 years (Match!) |
| Skills/Specialties ... | Windows NT / 2000 / XP Networking (Match!) |
| Skills/Specialties ... | Microsoft Windows 3.x, 95/98/Me, 2000, or XP - General Use |
| Skills/Specialties ... | HTML |
| Skills/Specialties ... | Visual Basic (VB) (Match!) |
| Salary ... | 42229 |
| | Currency: US - Dollars |
| | Salary Type: Standard Full-Time 40 + Hours Per Week |
| Vacation Time ... | 2.5 |
| Benefits/Perks ... | Medical/Dental/Vision/Health Insurance |
| Benefits/Perks ... | Casual Dress/Atmosphere |
| Benefits/Perks ... | Flex-Time |
| Benefits/Perks ... | Paid Sick Leave |
| Job Location ... | City: Albany |
| | State or Province: New York |
| | Country: United States |
| Certifications ... | Microsoft Certified Professional (MCP) |
| Profile # 2 (Great Match: 76) | Source: PayScale Main |

FIG. 35

PayScale! SS16

Home | Your Profile | Alerts | Research | Logout

Welcome to the Research Center

Search - [         ]  Get Your Own Personal PayScale Report™  Read about Gold Membership
Report on any job topic! [Go] Track your pay!

This page contains salary/compensation reports for

People with Jobs in Network Administration/IT/Information Systems

You can also get your own Personal PayScale Report

[-Other related topics ▼]

Report: Hourly Billing Rate - Bonus - Company Sales - Hourly Rate
Popular Tallies - Profit Disbursements - Salary - Vacation

FREE vs. Paid Reports??

Increase your pay!

Free reports (like on this page) are great for summary information. But your boss might be able to argue why you make more or less than these figures.

On the other hand, your $9.95 Personal PayScale Report compares people just like you, and provides a detailed salary analysis ...It is the most accurate evaluation available and makes the strongest case when negotiating or evaluating your pay. For the pace of a lunch, it's a "must have" for anyone who works.

Buy yours now.
Satisfaction is guaranteed

Median Salary By City
For People with Jobs in Network Administration/??/Information: Systems reporting:83
Avg. age of report data:333
Currency:US - Dollars

Computer Systems Analyst (406444) (Range:54457 -60974)
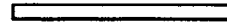 23768

Information Systems (15) Manager (287640)(Range:6719-79024)
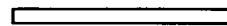 74842

Network & Computer Systems Administrator / Systems Programmer (705680)(Range:46536-52525)
 51338

Database Administrator (DBA)(98428)(Range:50225-56087)
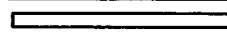 52248

Network Systems / Data Communications Analyst (97364)(Range: 51098-58785)
 55158

Programmer Analyst (14970)(Range:14920-50819)
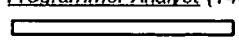 36531

Applications Systems Analyst (10505)(Range:36306-49272)
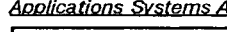 38275

(c)2000-2001 PayScale, Inc

Charts to the left have roughly the following skew by location.

States Breakdown.
For People with Jobs in Network Administrations/IT/Information Systems ☐ California
☐ Texas

*FIG. 36*

PayScale! SS17    *Home* | *Your Profile* | *Alerts* | *Research* | *Logout*

@yahoo.com's...

Weekly Compensation Alerts you have been a subscribing member since 11/20/2003 11:17:53 A.M.

Show data for the week of:.
MONDAY, DECEMBER 04, 2002.   Sunday, November 24, 2002   Saturday, November 09, 2002   Friday, October 25, 2002

Recent Compensation Data.
For People Like You

SALARY (ANNUAL) Vacation Weeks Bonus (Annual) Hourly Rate Work Week Overtime Rate Overtime Hours Monthly Income Annual Profit Share Yearly Sales for Commission Commission Rate

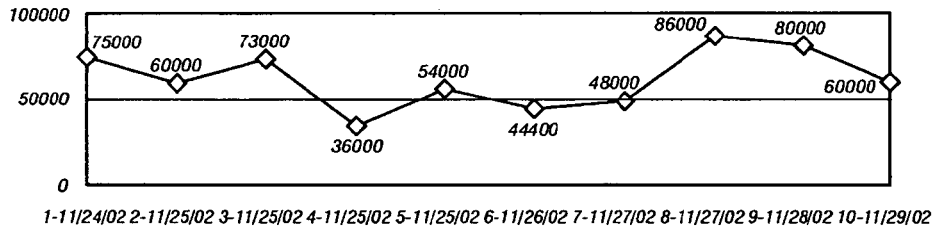

1-11/24/02 2-11/25/02 3-11/25/02 4-11/25/02 5-11/25/02 6-11/26/02 7-11/27/02 8-11/27/02 9-11/28/02 10-11/29/02

(c)2000-2001 PayScale, Inc

Summary 51 new in People Like You 104 new in Industry=IT -- Computer, Software 75 new in Industry=IT -- Networking 59 new in Industry=IT -- Computer, Hardware / Systems 3 new in Industry=Nursing 116 new in People with Jobs in Network Administration/IT/Information Systems 29 new in Job=Computer / Network Support Technician

New Profiles
For People Like You

View Profiles   PayScale Report

Profile #1

View Profiles   Research Center

Industry ...    IT -- Computer, Hardware (Match!)

View Profiles   Research Center   Industry ...    IT -- Networking (Match!)

View Profiles   Research Center   Current Employer ...    Employer Type: Other On View Profiles   Research Center    Employer Name: This Date withheld for privacy. More View Profiles   Research Center      Years with Employer: 1

Job/Position/Title ...    Consultant, IT

View Profiles   Research Center   Years In Field/ Career ...    1

*FIG. 37*

```xml
<?xml version="1.0 ?>
<Schema xmins="urn : schemas=microsoft-com:xml-data">

<!--fg : A fieldgroup, aka , a question, consists of multiple
fields and attributes -->
<ElementType name="fg">

<!-- name : name is how fg is identified, must be unique -->
    <attribute type="name" required="yes"/>

<!--desc : Short description of fg appearing in question display -
->
    <attribute type="desc" default=""/>

<!-- Longdesc : Longer description of fg appearing in question
display - -->
    <attribute type="longdesc" default=""/>

<! - - allowmulti : if 1, this question allows multiple responses, if
0, does not - -->
    <attribute type="allowmulti" default=""/>

<!- -importance : no longer used? - -->
    <attribute type="importance" default="General"/>

<!-- level: no longer used? -->
    <attribute type="level" default="5"/>

<!-- visible: is this question visible (i.e, survey is not visible
since it is a system generated question -->
    <attribute type="visble" default="1"/>

<!-- field: a data point within a fieldgroup. Multiple fields may
exist in a question. -->
<!-- eg., if salary is fieldgroup, salary, currency, and workweek
    <element type="field" />
</ElementType>

</Schema>
```

*FIG. 38*

```xml
<!-- field: a data point -->
<ElementType name="field">
<!-- name : name is how field is identified, must be unique -->
    <attribute type="name" required="yes"/>

<!-- desc : desc is how field is described in display -->
    <attribute type="desc" default="">

<!-- type : datatype with one of the following values -->
<!-- "string", "numeric", "currency" -->
    <attribute type="type" default="string"/>

<!-- displaytype : how is this field displayed? -->
<!-- one of the following values -->
<!-- "input box", "dropdown"," -->
    <attribute type="displaytype" default="input box"/>

<!-- autoaffinity:do new answers to this field generate affinity
groups with that new answer as the only value automatically? -->
<!-- 1=yes, 0=no -->
    <attribute type="autoaffinity" default="0"/>

<!-- showpopular: do we show popular answers to this field? -->
<!-- this only applies to string answers, not numeric or currency
-->
<!-- 1=yes, 0=no -->
<!-- an example of "no" is zip code, which is a text field, but
showing popular zip codes is not useful -->
    <attribute type="showpopular" default="1"/>

<!-- affinityimportance : this is no longer used -->
    <attribute type="affinityimportance" default="1"/>

<!-- showrelated: this is no longer used -->
    <attribute type="showrelated" default="1"/>
```

*FIG. 39*

```
<!-- prompt:  a text value that shows what the prompt is next to
this question on display -->
    <attribute type="prompt" default=""/>

<!-- deterministic:  used in conjunction with "autoaffinity", if
autoaffinity=1, then deterministic -->
<!-- means that the affinity is "deterministic", and hence is used
in calculating smart reports (people like you) -->
<!-- this will be removed in a future version -->

<attribute type="deterministic" default="1"/>

<!-- level:  no longer used -->
    <attribute type="level" default="5"/>

<!-- answervalue:  a pre-defined answer value for this field. This
is useful for pre-loading some answers into the system -->
<!-- multiple answervalues are allowed. -->
    <element type="answervalue" />
</ElementType>
```

FIG. 39
*(Continued)*

```
<!-- affinity : a grouping of profiles, by property -->
<ElementType name="affinity">
<!-- name : a unique name for this affinity -->
    <attribute type="name"/>
<!-- affinityimportance : no longer used -->
    <attribute type="affinityimportance" default="1"/>
<!-- deterministic : 0=no, 1=yes, if yes, than this affinity is
used to determine "people like you" in smart report -->
<!-- may be deprecated soon -->
    <attribute type="deterministic" default="1"/>
</ElementType>
```

FIG. 40

```xml
<!-- report: an aggregate definition, which is used by the report
engine to create aggregates -->
<!-- each report is aggregate over all affinity groups, given a
measure (optional), dimension (optional) -->
<!-- aggregate report contains datasource, affinity_id, count,
avg (measure), dimension, avg (age of data) -->
<!-- future aggregates may contain medians, other statistical
measures -->
<ElementType name="report">
<!-- name: a unique -->name for this report -->
    <attribute type="name"
<!-- measure: no longer used -->
    <element type="measure"/>
<!-- aggregate : no longer used -->
    <attribute type="aggregate"/>
<!-- measurefg: the fieldgroup of this measure (ie, "salary) -->
    <attribute type="measurefg" default=""/>
<!-- measurefg" the field of this measure (ie, "salary") -->
<!-- if measurefg is "", then only count is given -->
    <attribute type="measurefield" default=""/>
<!-- dimesionfg= the fg of this dimension (ie, "industry") -->

<!-- if dimensionfg is "", then measure is averaged and counted
over entire group (single value) -->
    <attribute type="dimesionfg" default=""/>
<!-- dimensionfield: the field of this dimension (ie, "industry")
-->
    <attribute type="dimensionfield" default=""/>
<!--minmeasure: artifact that is the default minimum used by
displaymechanism for report -->
<!-- will be deprecated -->
    <attribute type="minmeasure" default="0"/>
<!-- maxmeasure: artifact that is the default maximum used by
display mechanism for report -->
<!-- will be deprecated -->
    <attribute type="maxmeasure" default="200000"/>
<ElementType>
```

*FIG. 41*

```
<ElementType name="profile">

<!-- answergroup: a set of answers to a particular question [or
this profile -->
    <--element type ="answergroup" />
<!-- name: a descriptive name that must be unique for this profile
-->
    <attribute type="name" required="yes"/>

<!-- desc: a description used to store information about this
profile in the db -->
    <attribute type="desc" default=""/>

<!-- importance: no longer used -->
    <attribute type= importance" />

<!-- status: determines if this is a seed profile or a normal
profile -->
<!-- seed profiles are not used in aggregate average calculations -
->
<!-- but are used in popular question and answer weightings -->
<!-- registered profiles are used in everything -->
<!-- answers: "seed", "registered" -->
    <attribute type="status" />

<!-- weight: how many people this profile represents. Used to take
in surveys -->
<!-- with only aggregate data. An individual profile has a weight
of 1 -->
    <attribute type="weight" default="1"/>

<!-- lastupdated: the date/time that this profile was updated last
-->
<!-- used to age data -->
    <attribute type="lastupdated" default=""/>
</ElementType>
```

*FIG. 42*

```
<!-- answergroup: a group of answers for a profile -->
<ElementType name="answergroup">
<!-- name: the fg name for this answergroup -->
    <attribute type="name" required="yes"/>
<!-- answer: the answer to aparticular field (can be multiple) -->
    <element type="answer" />
</ElementType>
```

FIG. 43

```
<!-- reportgroup: display instructions for a report, such as the
Smart Report or Research Center -->
<!-- data is stored in tables which is used currently by hardcoded
pages -->
<!-- more generic reportgroups coming soon -->
<ElementType name="reportgroup">
<!-- name: unique name of this reportgroup -->
<!-- desc: comment description -->
    <attribute type = "desc" default=""/>
<!-- reportarea: groupings of reports -->
    <element type = "reportarea"/>
</ElementType>
```

FIG. 44

```
<!-- reportarea: groupings of reports (ie. "Salary Reports",
Reports about Demographics", etc) -->
<ElementType name="reportarea">
<!-- name: unique name of this report area -->
    <attribute type="name" required="yes"/>
<!-- desc: description of this reportarea -->
    <attribute type="desc" default=""/>
<!--memberreport: information about which report to display, and
how to display it -->
    <element type="memberreport"/>
</ElementType>
```

FIG. 45

```
<ElementType name="memberreport">
<!-- name: report name, defined from report tag, must exist already
-->
    <attribute type="name" required="yes"/>
<!-- reportdisplaytype: the way this report is displayed -->
<!-- choices: "pie chart", "bar chart", "pie chart with matches",
"table" -->
<!-- new choices may be addes as they are coded -->
    <attribute type="reportdisplaytype" default="bar chart"/>
<!-- rowcount: number of rows to show in report, 0 means all rows -
->
    <attribute type="rowcount" default="0"/>
<!-- reportcaption: short caption describing report -->
    <element type="reportcaption" />
<!-- reportexplanation: longer explanation descriping report -->
    <element type="reportexplanation" />
</ElementType>
```

FIG. 46

```
<!-- wizard: a set of questions aiming to get information from a
user regarding some "purpose" -->
    <ElementType name="wizard">
<!-- id: unique number identifying this wizard -->
        <attribute type="id" />
<!-- relationtype: 0=fieldgroup relation (question relation) -->
<!-- relationtype: 1=answer relation -->
        <attribute type="relationtype" default="0" />
<!-- clearrelations: 0=no, 1=yes clears all previos relations for
this wizard (for this relationtype) when loading -->
        <attribute type="clearrelations" default="0" />
<!-- clearlevels: 0=no, 1=yes clears all levels for this wizard when
loading -->
        <attribute type="clearlevels" default="0"/>
<!-- relation: definition of a specific relationship -->
        <element type="relation"/>
<!-- level: definition of a specific level -->
        <element type="level"/>
    </ElementType>
```

FIG. 47

```
<!-- relation: a relationship between a fieldgroup and a parent
fieldgroup/field -->
    <ElementType name="relation">
<!-- name: the name of the fieldgroup -->
        <attribute type="name" />
<!-- parent: the name of the parent fieldgroup -->
        <attribute type="parent" />
<!-- parentfield: the name of the parent field (within the parent
fieldgroup) -->
        <attribute type="parentfield" />
    </ElementType>
```

FIG. 48

```
<!-- level: a definition of a constraint and ordering mechanism
within a wizard -->
    <ElementType name="level">
<!-- id: the priority of this level - the lower the number, the
earlier it appears -->
        <attribute type="id" />
<!-- is required = 0=no, 1=yes if the level is required, one fg from
the level must be answered, or the default fg is asked -->

<attribute type="isrequired" default="0" />
<!-- fg: name of fg in this level -->
        <element type="fg" />
    </ElementType>
```

FIG. 49

```
<!-- profilesearch: a scored search consisting of combinations of
groups of questions -->
<ElementType name="profilesearch">
<!-- name: unique name describing this search -->
    <attribute type="name"/>
<!-- mincount: the minimum number of profiles which must match
to be included in the results -->
    <attribute type="mincount"/>
<!-- maxcount: the maximum number of profiles which can be
included in the results -->
    <attribute type="maxcount"/>
<element type"filter" />
<element type"survey" />
<element type"matchgroup" />
<element type"ranking" />

<ElementType>
```

FIG. 50

```
<!-- matchgroup: a group of questions -->
<ElementType name "matchgroup">
<!-- name: the name of the survey to be used -->
    <attribute type="name" />
    <attribute type="search" />
</ElementType>
```

FIG. 51

```
<ElementType name="ranking">
<!-- name: the nameof this ranking -->
    <attribute type="name"/>
<!-- low: the low score in this ranking -->
    <attribute type="low"/>
<!--high: the high score in this ranking -->
    <attribute type="high"/>
</ElementType>
```

FIG. 52

```
<?xml version "1.0" ?>
<survey name="Underpaid.com Main Survey" datasource "Underpaid.com
<Web Survey" xmins="x-schema:/xml/schema.xml">
    <targetgroup name="General - Industry FieldGroups">
            <fg name="Survey" desc= "survey" longdesc="Survey"
allowmulti="0" level="1" category="Profession and Experience"
visible="0">
                        <field name="Survey" desc="Survey"
type="string" displaytype="input box" level="1" autoaffinity="1"
showpopular="1" showrelated="0" deterministic="0">
                                <answervalue name="Underpaid.com
Main Survey"></answervalue>
                        </field>
            </fg>
            <fg name="Industry" level="2" desc="Industry"
longdesc="industry is the type of work or profession you are in."
allowmulti="1" category="Profession and Experience">
                        <field name="Industry" level="2"
desc="Industry type="string" displaytype="input box"
autoaffinity="1" showpopular="1" prompt="Select your primary
Industry. You may choose more than one if needed:"> </field>
            </fg>
    </targetgroup>
</survey>
```

*FIG. 53*

```xml
<!-- INDUSTRY & PRODUCTACTIVITY REPORTS -->
<report name="Average Salary by Industry"
measurefg="salary" measurefield="Salary" dimensionfg="Industry"
dimensionfield="Industry"/>
    <report name="Average Company Market Cap by Industry"
measurefg="CompanyMarketCap" measurefield="CompanyMarketCap"
dimensionfg="Industry" dimensionfield="Industry"/>
    <report name="Average Company Sales by Industry"
measurefg="CompanySales" measurefield="CompanySales"
dimensionfg="Industry" dimensionfield="Industry"/>
    <report name="Average Hourly Rate by Industry"
measurefg="Hourly Rate" minmeasure="0" maxmeasure="600"
measurefield="Hourly Rate" dimensionfg="Industry"
dimensionfield="Industry"/>
    <report name="Average Bonus by Industry"
measurefg="Bonus" minmeasure="0" maxmeasure="100000"
measurefield="Bonus" dimensionfg="Industry"
dimensionfield="Industry"/>
    <report name="Average Vacation Weeks by Industry"
minmeasure="0" maxmeasure="20" measurefg="Vacation"
measurefield="Vacation" dimensionfg="Industry"
dimensionfield="Industry"/>
    <report name="Average Profit Disbursement by Industry"
measurefg="Profit Share" measurefield="Annual Profit Disbursement"
dimensionfg="Industry" dimensionfield="Industry"/>
    <report name="Average Hourly Billing Rate by Industry"
measurefg="Hourly Billing Rate" measurefield="Hourly Billing Rate"
dimensionfg="Industry" dimensionfield="Industry"/>
    <report name="Average Salary by ProductActivity"
measurefg="Salary" measurefield="Salary"
dimensionfg="ProductActivity" dimensionfield="ProductActivity"/>
    <report name="Average Bonus by ProductActivity"
measurefg="Bonus" minmeasure="0" maxmeasure="100000"
measurefield="Bonus" dimensionfg="ProductActivity"
dimensionfield="ProductActivity"/>
    <report name="Average Company Market Cap by
ProductActivity" measurefg="CompanyMarketCap"
measurefield="CompanyMarketCap" dimensionfg="ProductActivity"
dimensionfield="ProductActivity"/>
    <report name="Average Company Sales by
ProducActivity" measurefg="CompanySales"
measurefield="CompanySales" dimensionfg="ProductActivity"
dimensionfield="ProductActivity"/>
```

*FIG. 54*

```xml
<?xml version="1.0" ?>
<survey name="Underpaid.com Main Survey" datasource="Underpaid.com Web Survey" xmlns="x-schema:/xml/schema.xml">
    <targetgroup name="General reports">
        <reportgroup name="RESEARCHREPORT" desc="Research Report">
            <reportarea name="POPULARTALLIES" desc="Popular Tallies">
                <memberreport name="Most Popular Cities" reportdisplaytype="Pie Chart" rowcount="7">
                    <reportcaption>Most Popular Cities</reportcaption>
                    <reportexplanation>Top 7 Most Popular Cities.</reportexplanation>
                </memberreport>
                <memberreport name="Most Popular States" reportdisplaytype="Pie Chart" rowcount="7">
                    <reportcaption>Most Popular States</reportcaption>
                    <reportexplanation>Top 7 Most Popular States.</reportexplanation>
                </memberreport>
                <memberreport name="Most popular Skills" reportdisplaytype="Pie Chart" rowcount="10">
                    <reportcaption>Most Popular Skills</reportcaption>
                    <reportexplanation>Top 10 most Popular Skills.</reportexplanation>
                </memberreport>
                <memberreport name="Most Popular Certifications" reportdisplaytype="Pie Chart" rowcount="7"
                    <reportcaption>Most Popular Benefits</reportcaption>
                    <reportexplanation>Top 7 Most Popular Benefits.</reportexplanation>
                </memberreport>
                <memberreport name="Gender Breakdown" reportdisplaytype="Pie Chart" rowcount="7"
                    <reportcaption>Gender Breakdown Report</reportcaption>
                    <reportexplanation>Males
```

*FIG. 55A* and Females.</reportexplanation>
                                                                                    </memberreport>
                                                          <memberreport names="Age Range Breakdown" reportdisplaytype="Pie Chart" rowcount="7"
                                                                          <reportcaption>Age Range Breakdown Report</reportcaption>
                                                                                     <reportexplanation>Age Ranges.</reportexplanation>
                                                               </memberreport>
                               <memberreport name="Most Popular Practice Areas" reportdisplaytype="Pie Chart" rowcount="7"
                                                             <reportcaption>Most Popular Practice Areas</reportcaption>
                                                                  <reportexplanation>Top 7 Most Popular Practice Areas.<reportexplanation>
                                                                       </memberreport>
                               <memberreport name="Most Popular Schools" reportdisplaytype="Pie Chart" rowcount="7">
                                                             <reportcaption>Most Popular Schools</reportcaption>
                                                                  <reportexplanation>Top 7 Most Popular Schools.<reportexplanation>
                                                                      </memberreport>
                             </reportarea>
                             <reportarea name="SALARY" desc="Salary">
                                 <memberreport name="Average Salary By Years_Experience Range" reportdisplaytype="Bar Chart" rowcount="0"
                                                                 <reportcaption>Average Salary By Experience</reportcaption>
     <reportexplanation>Average Salary By Years Experience.</reportexplanation>
                                                      </memberreport>
                             <memberreport name="Average Salary By Skill" reportdisplaytype="Bar Chart" rowcount="10">
                                                                <reportcaption>Average

*FIG. 55A*
*(Continued)*

Salary By Skill</reportcaption>
<reportexplanation>Top 10 Highest Salary Skills.</reportexplanation>
</memberreport>
<memberreport name="Average Salary By Certification" reportdisplaytype="Bar Chart" rowcount="10">
<reportcaption>Average Salary By Certification</reportcaption>
<reportexplanation>Top 10 Highest Salary Certifications.</reportexplanation>
</memberreport>
<memberreport name="Average Salary By Employer" reportdisplaytype="Bar Chart" rowchart="7"
<reportcaption>Average Salary By Employer</reportcaption>
<reportexplanation>Top 7 Highest Salary Employers.</reportexplanation>
</memberreport>
<memberreport name=Average Salary by Employer Type" reportdisplaytype="Bar Chart" rowcount="0"
<reportcaption>Average Salary By Employer Type</reportcaption>
<reportexplanation>Average Salary By Employer Type.</reportexplanation>
</memberreport>
<memberreport name="Average Salary By Industry"reportdisplaytype="Bar Chart" rowcount="7">
<reportcaption>Average Salary By Industry</reportcaption>
<reportexplanation>Top 7. Highest Salary Industries.</reportexplanation>
</memberreport>
<memberreport name="Average Salary By ProductActivity" reportdisplaytype="Bar Chart" rowcount="7">
<reportcaption>Average Salary By Product Activity</reportcaption>
<reportexplanation>Top 7 Highest Salary Product Activities.</reportexplanation>
</memberreport>
<memberreport name="Average Salary

FIG. 55B

By Job" reportdisplaytype="Bar Chart" rowcount="7"
<reportcaption>Average Salary By Job</reportcaption>
<reportexplanation>Top 7 Highest Salary Jobs.</reportexplanation>
</memberreport>
<memberreport name="Average Salary By Position" reportdisplaytype="Bar Chart" rowcount="7">
<reportcaption>Average Salary By Position</reportcaption>
<reportexplanation>Top 7 Highest Salary Position By Positions.</reportexplanation>
</memberreport>
<memberreport name="Average Salary By City" reportdisplaytype="Bar Chart" rowcount="7">
<reportcaption>Average Salary By City</reportcaption>
<reportexplanation>Top 7 Highest Salary Cities.</reportexplanation>
</memberreport>
<memberreport name="Average Salary By State" reportdisplaytype="Bar Chart" rowcount="7">
<reportcaption>Average Salary By State</reportcaption>
<reportexplanation>Top 7 Highest Salary States.</reportexplanation>
</memberreport>
<memberreport name="Average Salary By Age Range" reportdisplaytype="Bar Chart" rowcount="0">
<reportcaption>Average Salary By Age</reportcaption>
<reportexplanation>Average Salary By Age Range.</reportexplanation>
</memberreport>
<memberreport name="Average Salary By Gender" reportdisplaytype="Bar Chart" rowcount="2">
<reportcaption>Average Salary By Gender</reportcaption>
<reportexplanation>Female vs. Male Average Salaries.</reportexplanation>
</memberreport>
<memberreport name="Average Salary By Practice Area" reportdisplaytype="Bar Chart" rowcount="7">
<reportcaption>Average

*FIG. 55B*
*(Continued)*

Salary by Practice Area</reportcaption>
                                                  <reportexplanation>Top 7 Highest Salary Practice Areas.</reportexplanation>
                                                      </memberreport>
                                        <memberreport name="Average Salary by Lawyers in Firm Range" reportdisplaytype="Bar Chart" rowcount="0"
                                                <reportcaption>Average Salary by Size of Firm</reportcaption>

<reportexplanation>Salaries vs. Number of Lawyers in Firm.</reportexplanation>
                                                    </memberreport>
                                        <memberreport name="Average Salary by School" reportdisplaytype="Bar Chart" rowcount="7"
                                                <reportcaption>Average Salary by School</reportcaption>
                                                <reportexplanation>Top 7 Highest Salary Schools.</reportexplanation>
                                               </memberreport>
                                    </reportarea>
</reportgroup>

*FIG. 55C*

```xml
<survey name="Major League Baseball-2000" datasource="Underpaid.com Web Survey" xmins="X-schema:/xml/schema.xml">
    <targetgroup name="Major League Baseball-2000">
<!-- Questions (defined in the main survey - don't define here, or else data might not be available to main survey!) -->
        <fg name="Survey"/>
        <fg name="Industry"/>
        <fg name="Sport"/>
        <fg name="Gender"/>
        <fg name="Salary"/>
        <fg name="Height"/>
        <fg name="Weight"/>
        <fg name="Age"/>
        <fg name="Team"/>
        <fg name="Position"/>
        <fg name="RBIs"/>
        <fg name="Batting Average"/>
        <fg name="Stolen Bases"/>
        <fg name="Slugging Percentage"/>
        <fg name="On Base Percentage"/>
        <fg name="Number Games"/>
        <fg name="At Bats"/>
        <fg name="Runs"/>
        <fg name="Hits"/>
        <fg name="Total Bases"/>
        <fg name="Doubles"/>
        <fg name="Triples"/>
        <fg name="Home Runs"/>
        <fg name="Bases On Balls"/>
        <fg name="Batter Stike Outs"/>
        <fg name="Errors"/>

<!--Profiles (this is the data - use the "weight" field to show how many people) -->

<profile name="Adam Kennedy" weight="1" status="registered" desc="" lastupdated="12/30/2000">
            <answergroup name="survey">
                <answer name="survey">Major League Baseball-2000</answer>
            </answergroup>
            <answergroup name="industry">
                <answer
```

*FIG. 56A*

```
name="industry">Sports</answer>
                    <answergroup name="gender">
                        <answer
name="gender">Male</answer>
                    </answergroup>
                    <answergroup name="sport">
                        <answer
name="sport">Basebal<answer
                        <answer
name="sport_type">Professional</answer>
                    </answergroup>
                    <answergroup name="team">
                        <answer name="team">Anaheim
Angels</answer>
                    </answergroup>
                    <answergroup name="position">
                        <answer name="position">2nd
Baseman</answer>
                    </answergroup>
                    </answergroup name="salary">
                        <answer
name="salary">202500</answer>
                        <answer name="currency">US -
Dollars</answer>
                    </answergroup>
                    <answergroup name="age">
                        <answer name="age">25</answer>
                    </answergroup>
                    <answergroup name="height">
                        <answer
name="height">6'1"</answer>
                    </answergroup
                    <answergroup name="weight">
                        <answer name="weight">180</answer>
                    </answergroup>
                    <answergroup name="batting average">
                        <answer name="batting
average">0.266</answer>
                    </answergroup>
                    <answergroup name="slugging percentage">
                        <answer name="slugging
```

*FIG. 56A*
*(Continued)*

```
Percentage">0.403</answer>
        </answergroup>
        <answergroup name="On Base Percentage">
            <answer name="On Base Percentage">0.3</answer>
        </answergroup>
        <answergroup name="Number Games">
            <answer name="Number Games">156</answer>
        </answergroup>
        <answergroup name="At Bats">
            <answer name="At Bats">598</answer>
        </answergroup
        <answergroup name="runs">
            <answer name="runs">82</answer>
        </answergroup>
        <answergroup name="Hits">
            <answer name="Hits">159</answer>
        </answergroup>
        <answergroup name="Total Bases"
            <answer name="Total Bases">241</answer>
        </answergroup>
        <answergroup name="Doubles">
            <answer name="Doubles">33</answer>
        </answergroup>
        <answergroup name="Triples">
            <answer name="Triples">11</answer>
        </answergroup>
        <answergroup name="Home Runs">
            <answer name="Home Runs">9</answer>
        </answergroup>
        <answergroup name="RBIs">
            <answer name="RBIs">72</answer>
        </answergroup>
        <answergroup name="Bases On Balls">
            <answer name="Bases On Balls">28</answer>
        </answergroup>
        <answergroup name="Batter Strike Outs">
            <answer name="Batter Strike
```

*FIG. 56B*

```
            Outs">73</answer>
                        </answergroup>
                        <answergroup name="Stolen Bases">
                                <answer name="Stolen
Bases">22</answer>
                        </answergroup>
                        <answergroup name="Errors">
                                <answer name="Errors">19</answer>
                        </answergroup>
                </profiles>
                <profile name="Ben Molina" weight="1"
status="registered" desc"" lastupdated="12/30/2000">
                        <answer name="survey">Major League
Baseball-2000</answer>
                        </answergroup>
                        <answergroup name="industry">
                                <answer
name="industry">Sports</answer>
                        </answergroup>
                        <answergroup name="gender">
                                <answer
name="gender">Male</answer>
                        </answergroup>
                        <answergroup name="sport">
                                <answer
name="sport">Baseball</answer>
                                <answer
name="sport_type">Professional</answer>
                        </answergroup>
                        <answergroup name="team">
                                <answer name="team">Anaheim
Angels</answer>
                        </answergroup>
                        <answergroup name="position">
                                <answer
name="position">Catcher</answer>
                        </answergroup>
                        <answergroup name="salary">
                                <answer
name="salary">210000</answer>
                                <answer name="currency">US-
```

FIG. 56B
*(Continued)*

```
Dollars</answer>
            </answergroup>
            <answergroup name="age">
                <answer name="age">27</answer>
            </answergroup>
            <answergroup name="height">
                <answer name="height">5'11"</answer>
            </answergroup>
            <answergroup name="weight">
                <answer name="weight">207</answer>
            </answergroup>
            <answergroup name="Batting average">
                <answer name="batting average">0.281</answer>
            </answergroup
            <answergroup name="slugging percentage">
                <answer name="slugging percentage">0.421</answer>
            </answergroup>
            <answergroup name="On Base Percentage">
                <answer name="On Base Percentage">0.318</answer>
            </answergroup>
            <answergroup name="Number Games">
                <answer name="Number Games">130</answer>
            </answergroup>
            <answergroup name="At Bats">
                <answer name="At Bats">473</answer>
            </answergroup>
            <answergroup name="Runs">
                <answer name="runs">59</answer>
            </answergroup>
            <answergroup name="Home Runs">
                <answer name="Home
```

*FIG. 56C*

```xml
            Runs">9</answer>
                              </answergroup>
                              <answergroup name="Hits">
                                      <answer name="Hits">133</answer>
                              </answergroup>
                              <answergroup name="Total Bases">
                                      <answer name="Total
      Bases">199</answer>
                              </answergroup>
                              <answergroup name="Doubles">
                                      <answer name="Doubles">20</answer>
                              </answergroup>
                              <answergroup name="Triples">
                                      <answer name="Triples">2</answer>
                              </answergroup>
                              <answergroup name="Home Runs">
                                      <answer name="Home
      Runs">14</answer>
                              </answergroup>
                              <answergroup name="RBIs">
                                      <answer name="RBIs">71</answer>
                              </answergroup>
                              <answergroup name="Bases On Balls">
                                      <answer name="Bases on
      Balls">23</answer>
                              </answergroup>
                              <answergroup name="Batter Strike Outs">
                                      <answer name="Batter Strike
      Outs">33</answer>
                              </answergroup>
                              <answergroup name="Stolen Bases">
                                      <answer name=""Stolen
      Bases">1</answer>
                              </answergroup>
                              <answergroup name="Errors">
                                      <answer name="Errors">7</answer>
                              </answergroup>
                </profiles>
          </targetgroup>
</survey>
```

*FIG. 56C*
*(Continued)*

```
<?xml version="1.0" ?>
<wizard id="1" relationtype="1" clearrelations="1" xmlns:::"x-
schema:/xml/relations-scheme.mxl">
    <relation name="industry" parent="survey" parentfield="survey"
/>

<relation name="sport"   parent="industry"
parentfield="industry"/>

<relation name="practice area"  parent="industry"
parentfield="industry"/>
    <relation name="productactivity" parent="industry"
parentfield="industry"/>
    <relation name="Store Category" parent="industry"
parentfield="industry"/>
    <relation name="Restaurant Category" parent="industry"
parentfield="industry"/>
    <relation name="Cuisine" parent="industry"
parentfield="industry"/>
    <relation name="Genre" parent="industry"
parentfield="industry"/>
</wizard>
```

FIG. 57

```xml
<?xml version="1.0" ?>
<wizard id="1" relationtype="0" clearrelations="1" xmins="x-schema :/xml/relations-schema.xml <relation name="industry" parent="survey" parentfield="survey"/>

<relation name="sport" parent="industry" parentfield="industry"/>
    <relation name="practice area" parent="industry" parentfield= "industry"/>
    <relation name="productactivity" parent="industry" parentfield="industry"/>
    <relation name= "Store Category" parent="industry" parentfield="industry"/>
    <relation name="Restaurant Category" parent="industry" parentfield="industry"/>
    <relation name="Cuisine" parent="industry" parentfield="industry"/>
    <relation name="Genre" parent="industry" parentfield="industry"/>

<relation name\"job" parent="industry" parentfield=" industry"/>
    <relation name\"job" parent="sport" parentfield="sport"/>
    <relation name="job" parent+practice area" parentfield="practice area"/>
</wizard>
```

*FIG. 58*

```xml
<?xml version="1.0" ?>
<wizard id="1" clearlevels="1" xmins="x-schema:/xml/relations-schema_xml">
    <level id="1" isrequired="1">
            <fg name="industry" isdefault="1" />
    </level>
    <level id="2" isrequred="0">
            < fg name= "sport" />
            < fg name= "productactivity" />
            < fg name= "practice area" />
            < fg name= "store category" />
            < fg name= "restaurant category" />
            < fg name= "cuisine" />
            < fg name= "genre" />

</level>
    <level id="3" isrequred= "1">
            <fg name= "job" isdefault= "1"/>
            <fg name="position"/>
    <level></ wizard>
```

FIG. 59

```xml
<?xml version "1.0" ?>
<profilesearch name="SmartReport" mincount="2" maxcount="200"
maxage="2" intervaltype="yyyy" xmlns="x-
schema:/xml/profilesearchschema.xml">
    <!-- People who work 40 hours a week, or who have answered
salary, but not the workweek part -->
    <!-- People who are in the USA, or who haven't answered country -
->
    <filter name="STATE" priority="1" />
    <filter name="COUNTRY" priority="2" />
    <filter name="ALLPEOPLE" priority="3" />
    <!-- these are the surveys that this smart report uses -->
    <survey name="PayScale Main" />
    <survey name="Legal Journals - 2000" />
    <survey name="U.S. Bureau of Labor and Statistics" />
    <survey name="IT - 2001" />
    <survey name="Various" />
    <survey name="CEOs - SEC Data" />
    <matchgroup name="same or similar job" deterministic="1"
exactscore="14" maxscore="14" affinityscore="8">
            <!-- if they are in the same job or position it's a
high-scoring match -->
            <affinity class="SEARCH" />
            <search fg="job" field="job" />
            <search fg="position" field="position" />
    </matchgroup>
    <matchgroup name="same or similar industry" deterministic="0"
exactscore="2" maxscore="4" affinityscore="1">
            <!-- being in the same industry (or any of the
following) is good, but it won't make it on it's own -->
            <affinity class="SEARCH" />
            <search fg="industry" field="industry" />
    </matchgroup>
    <matchgroup name="specific job attribute" deterministic="1"
exactscore="5" maxscore="10" affinityscore="2">
            <search fg="practice area" field="practice area" />
            <search fg="teaching rank" field="teaching rank" />
    </matchgroup>
    <matchgroup name="same or similar skills" deterministic="1"
exactscore="2" maxscore="8" affinityscore="1">
            <affinity class="SEARCH" />
            <search fg="skill" field" field="skill" />
```

*FIG. 60A*

```
        </matchgroup>
        <matchgroup name="same or similar certifications"
deterministic="1" exactscore="2" maxscore="8" affinityscore="1" />
                <affinity class="SEARCH" />
                <search fg="certifications" field="certifications" />
        </matchgroup>
        <matchgroup name="other job attribute" deterministic="1"
exactscore="4" maxscore="8" affinityscore="2">
                <!-- the existence of these fields are also quite
good. these are numeric -->
                <search fg="PIC_Hours" field="PIC_Hours" anyvalue="1"
/>
                <ssearch fg="grade taught" field="grade taught"
anyvalue="1" />
                <search fg="career_home_runs" field="career_home_runs"\
anyvalue="1"
                <search fg="rebounds" field="rebounds" anyvalue="1" />
        </matchgroup>
        <matchgroup name="same compensation type" deterministic="0"
exactscore="4" maxscore="4" affinityscore="1"
                <search fg="hourly billing rate" field="hourly billing
rate" anyvalue="1" />
        </matchgroup>
        <matchgroup name="same city" deterministic="0" exactscore="2"
maxscore="2" affinityscore="1">
                <search fg="location" field="city" />
        </matchgroup>
        <matchgroup name="same or nearby state" deterministic="0"
exactscore="4" maxscore="4" affinityscore="2">
                <affinity class="SEARCH" />
                <search fg="location" field="state" />
        </matchgroup>
        <matchgroup name="other qualifiers" deterministic="0"
exactscore="4" maxscore="8" affinityscore="1">
                <!-- these improve the overall match score, but are
non-deterministic -->
                <search fg="sport" field="sport" />
                <search fg="productivity" field="productivity"
/>
                <search fg="genre" field='genre" />
                <search fg="company filing status"
field="companystockexchange" />
                <search fg="bar association" field=" bar association"
/>
        </matchgroup?
```

FIG. 60A
*(Continued)*

```
<match group name="same employer" deterministic="0"
exactscore="1" maxscore-"1" affinityscore-"1">
        <!-- these improve the overall score quite a bit, but
are still non-deterministic -->
        <affinity class="SEARCH" />
        <search fg="employer" field="employer name" />
</matchgroup>
<matchgroup name="same experience level" deterministic="0"
exactscore="6" maxscore="6" aftinityscore="0">
        <!-- people in your same level of experience should
rise to the top -->
        <search fg="years__Experience Range"
field="years__Experience Range"
</matchgroup>
<ranking name="Good Match" low="7" high="15 />
<ranking name="Great Match" low"15" high="" />
</profilesearch>
```

*FIG. 60B*

AUTOMATED COMPENSATION REPORTS USING ONLINE SURVEYS AND COLLABORATIVE FILTERING

CROSS REFERENCE TO RELATED APPLICATIONS

This application is an application filed under 35 U.S.C. § 111(a), claiming benefit pursuant to 35 U.S.C. § 120 of the filing date of the Provisional Application Ser. No. 60/436,809 filed on Dec. 27, 2002, pursuant to 35 U.S.C. § 111(b), which is incorporated herein, in its entirety, by this reference thereto.

BACKGROUND OF THE INVENTION

1. Field of the Invention

The invention relates to correlating statistical records. More particularly, the invention relates to correlating compensation records to unique individual profiles.

2. Background of the Invention

Today, many reports are available that allow a user to find, read, purchase, or otherwise acquire reports on worker compensation. Most often these reports indicate average pay rates by industry, job type, locale, and sometimes they report more specific information about a particular industry or job, such as bonuses, stock options, average workweek, or immigration status, among other things. To create such compensation reports two approaches are typically used. One such approach is for a human analyst to research and find a statistically valid number of individuals with like characteristics, and devise a suite of compensation reports. This process is tedious, labor intensive, and often expensive. For a truly detailed report the analyst must be relied on to do substantial investigation and synthesize and apply this information to the case at hand. Compensation consultants with years of experience and resources can generally accurately profile an individual's worth in the market place, however such an analysis is extremely specialized and out of the reach of the typical consumer. Simpler and less costly reports are available but they are generally broadly classed and offer little utility.

The majority of software-based analysis provides a less expensive alternative but yields correspondingly limited information. Compensation services using current computer analysis programs generally gather data using some form of questionnaire and then feed the appropriate data into a computer database or spreadsheet. More typically, generalized data, such as from the US Bureau of Labor and Statistics, is used as a base and then extrapolated based on region and date, and often combined with third party surveys. Typically, a computer then is instructed to run an analysis of the data to provide statistical information, such as averages, medians, and standard deviations on pre-determined groups of people. However the information provided is not unique to an individual, but instead, is a conglomeration of data that the program determines best represents the individual. Because the categorization of the individual is based solely on a limited, predetermined set of responses to the questionnaire, it offers little to no opportunity for evaluating unique characteristics. For example, an automated compensation service may categorize and calculate data showing that the average yearly salary of a "Computer Programmer Level 3" in Washington state is $64,250. This may or may not be applicable to a "Senior Application Software Engineer" with "10 years of experience" and special training in the skill "C++," but because the closest answer describing the Senior Application Software Engineer's position in the initial survey was a "Computer Programmer Level 3," the Senior Application Software Engineer has thus been categorized ineffectively, which removes any unique abilities that he may possess.

The Senior Application Software Engineer reading the aforementioned report cannot be sure how closely the published report figures apply to himself individually. There are a multitude of factors that affect any one individual's job compensation. The current generalized reporting methods for compensation reports, cannot and do not incorporate factors that provide for an accurate job comparison and compensation analysis for individual users. Today's methods require the user to gauge or self-approximate themselves to a group of people being reported. Typically, such approximations are grouped by a specific job title that a human compensation analyst predetermines when creating a report, or when designing a computer service that eventually generates the report. This grouping is generally not an exact match with the user's actual job title and responsibilities and often has little applicability to the users individual qualities. For example, the compensation analyst might have created a report for an isolated group called Computer Programmer Level 3. For individuals who possess the same characteristics as the data files used to create this group, the reports generated from such a compensation analysis are reasonably accurate. However, for individuals possessing unique capabilities, experiences, skills, or talents, the reports are essentially useless. The data are by definition misapplied because any differences in the compared data are arbitrarily reflected in the compensation report. This introduces doubt on the user's part as to how closely he can trust the report's applicability.

Current compensation analysis techniques do not provide users with affordable, accurate, and personalized compensation reports. Job specific variables, critical to the accurate assessment of an individual's worth, are not correctly identified or uniformly applied. Furthermore individuals within a particular field are unaware of the value of certain, often easily obtainable, qualifications. There is a need, therefore, for an apparatus and method that provides online compensation reports using a more flexible survey system to produce dynamic profiles based on unique individual attributes, and to provide automated comparisons and reports that account for these attributes.

SUMMARY OF THE INVENTION

In one embodiment of the invention, profiles are used to produce individualized compensation reports. A survey engine is used to produce profiles of individuals that identify the individuals' unique characteristics. The survey engine incorporates a collaborative filtering engine that determines appropriate questions to ask the user during the survey, and also provides suggested possible answers. Additionally, the system allows for the use of open-text questions that allow for new answers to be input by the user, without the prior need for an administrator to pre-define the possible values for the system, as is typical in prior art. The system incorporates affinity groups around profile attributes (question answers), providing a basis for gauging similarity of profiles for various comparison and aggregation purposes. A collaborative filtering engine is incorporated, which is both periodically modified by an administrator, and also tuned by users themselves based on their actions and responses. New affinity groups (associations of profiles) are incorporated by the survey engine to suggest new questions and possible answers in a survey. Additionally, some affinity groups are generated automatically by the system, and finally by users themselves to create new, interesting relationships among profiles.

The collaborative filtering engine enables the capture of profile attributes that are targeted compensation variables concerning a profile. The system automatically incorporates new profiles into existing affinity groups, which allows more targeted survey questions and possible answers to be determined, without requiring constant human training or intervention.

Without a collaborative filtering system, the system would be unable to administer surveys accurately for users who do not fit into pre-defined categories because it is currently impossible to categorize every occupational variation. Because the system allows for open-text answers to questions, and because the system provides for different questions to be automatically determined and asked for differing types of user job profile, the collaborative filtering system, along with affinity groups and other requirements, is employed. Because the collaborative filtering system allows for the system to make educated guesses within defined constraints, the system can handle new categorizations more effectively than a system wholly defined by a human administrator. Additionally, in this system, the administrator defines constraints that prohibit the survey from asking obviously wrong or out of place questions. An example of a constraint is requiring that if the user does not answer any of the suggested questions, a default question is always asked.

One aspect of using a collaborative filtering system to define a survey is that the system accommodates a much larger population of data using a more targeted survey. Previous implementations of compensation surveys relied on a smaller sample size, a broad survey with generalized questions, or a larger base of analysts to design and conduct surveys and categorize the data. Thus, the survey was constrained purely by the human resources needed to conduct it. The invention described herein is not constrained as such and requires far fewer human resources to conduct such a detailed survey across many different job categories.

Another aspect of the invention comprises the ability to search through the data that has been collected by the survey engine, using detailed search criteria defined by a search definition document. The document applies a scoring and filtering mechanism that returns the most appropriate set of profiles based on the user's goal for the analysis. The search document is useful because it allows an administrator to define natural relationships between profile attributes, such as those that apply routinely to the realm of compensation analysis of various classes of profiles. The document is then interpreted by a software algorithm, and used during the retrieval of relevant profiles, which can then be used for tallying and reporting. Multiple search definition documents can be created quickly, each one for a different goal. For example, one search goal may be to weight skills and certifications very highly. The results are useful for analyzing how people with similar technical skills are compared to each other. Another search definition document could weight experience and education higher, which is useful in seeing how a user compares to those profiles who have similar experience and education levels. A third example could be to hold location constant, and compare a user to all other profiles with matching attributes in the same location.

Another aspect of the invention comprises the automated ability to summarize and present the results of a profile search in a format that is useful to a human for compensation comparisons. A Chart is defined as a series of values, such as skills paired, with a series of measures, such as average salary, median salary, standard deviation, etc. A sample chart could be called "Average Salary By Skill" and it would list each Skill along with an associated average salary. A Report is defined as a series of charts combined to provide an overall picture and analysis for a user. For instance, consider a report that aims to discover how a user compares with regard to skills and experience in similar jobs. This report incorporates many charts which are combined into a format that gives a user a good analysis and understanding of the results of the user's search goal.

The prior art approaches are unable to automate the selection of charts within a compensation report, such as determining if "Average Salary by Practice Area" is applicable to a report presented for a particular user profile. It may only be applicable to a Lawyer, for instance. The prior art typically requires that the administrator know in advance, every chart that would be relevant for a particular user. This restricts known approaches in one of two ways: either they limit the number of charts available, such that all charts are available to all compensation reports, regardless of their relevance, or they predefine different compensation reports by industry or job category, which would require a large amount of labor. In contrast, the invention described herein determines if a chart is relevant to a user based on the user's own profile, and displays it, and also only shows it if enough data exists for it to be valid statistically. An advantage of the invention herein is provided because there may be thousands of different charts of many different types, based on many different attributes and measures, and only a subset of them may apply to a particular users' compensation analysis. For instance, a Lawyer may wish to see a report concerning "Average Bonus by Number of Hours Billed per Year," but this report may not be applicable to Teachers or CEOs. In the prior art, each of these compensation reports must be compiled by a human analyst, created at expense, or details are ignored, leaving only the most common charts in the compensation report, such as "Average Salary by Occupation and Location," which are often the least useful to an individual trying to compare his compensation against his peers. The invention herein allows for a more targeted and relevant compensation report by focusing in an automated, scalable fashion, on attributes that are unique to a particular user, in addition to the attributes that are most common to all users.

The invention may also be used to match individual profiles to resumes because the profiles described herein are typically a subset of data gathered for a resume. For example, a user entering their profile into the system described herein could be easily matched to resumes using the same mechanisms employed to match against other profiles.

BRIEF DESCRIPTION OF THE DRAWINGS

FIG. 5 is a flow for saving a user's answer to a database according to the invention;

FIG. 6 is an exemplary profile according to the invention;

FIG. 19 is a series of rules used in the rules engine according to the invention;

FIG. 20 is a screen shot of the Home Page according to the invention;

FIG. 21 is a screen shot of the Suggest Question User Interface according to the invention;

FIG. 22 is a screen shot of the Browse AnswerValue User Interface according to the invention;

FIG. 23 is a screen shot of the Confirm Answer User Interface according to the invention;

FIG. 24 is a screen shot of the Choose Compensation Questions User Interface according to the invention;

FIG. 25 is a screen shot of the Salary FieldGroup User Interface according to the invention;

FIG. 26 is a screen shot of the Run Report User Interface according to the invention;

FIG. 27 is a screen shot of the Summary Report User Interface according to the invention;

FIG. 28 is a screen shot of the Profile User Interface according to the invention;

FIG. 29 is a screen shot of the Smart Report Page 1 User Interface according to the invention;

FIG. 31 is a screen shot of the Smart Report Page 2 User Interface according to the invention;

FIG. 32 is a screen shot of the Smart Report Page 3 User Interface according to the invention;

FIG. 33 is a screen shot of the Smart Report Page 4 User Interface according to the invention;

FIG. 34 is a screen shot of the Smart Report Page 5 User Interface according to the invention;

FIG. 35 is a screen shot of the Smart Report Page 6 User Interface according to the invention;

FIG. 36 is a screen shot of the Research Center User Interface according to the invention;

FIG. 37 is a screen shot of the Alerts User Interface according to the invention;

FIG. 38 is an XML specification for FieldGroups according to the invention;

FIG. 39 is an XML specification for Fields according to the invention;

FIG. 40 is an XML specification for Affinity Definition according to the invention;

FIG. 41 is an XML specification for Chart according to the invention;

FIG. 42 is an XML specification for Profile according to the invention;

FIG. 43 is an XML specification for AnswerGroup according to the invention;

FIG. 44 is an XML specification for ReportGroup according to the invention;

FIG. 45 is an XML specification for ReportArea according to the invention;

FIG. 46 is an XML specification for Member Report according to the invention;

FIG. 47 is an XML specification for Wizard according to the invention;

FIG. 48 is an XML specification for Relation according to the invention;

FIG. 49 is an XML specification for Level according to the invention;

FIG. 50 is an XML specification for Profile Search according to the invention;

FIG. 51 is an XML specification for Matchgroup according to the invention;

FIG. 52 is an XML specification for Ranking according to the invention;

FIG. 53 is an XML example for FieldGroup/Field according to the invention;

FIG. 54 is an XML example for Aggregate Definitions according to the invention;

FIGS. 55A-55C are an XML example for ReportGroup/ReportArea according to the invention;

FIGS. 56A-56C are an XML example for Surveys according to the invention;

FIG. 57 is an XML example for Answer Relations according to the invention;

FIG. 58 is an XML example for FieldGroup Relations according to the invention;

FIG. 59 is an XML example for Levels according to the invention; and

FIGS. 60A-60B are an XML example for Profile Search.

DETAILED DESCRIPTION OF THE INVENTION

A method and apparatus for providing targeted online compensation reports that accounts for unique individual job characteristics by using dynamic profiles is described in detail herein. In the following description, numerous specific details are provided for survey flow, affinities, levels, suggest FieldGroup, suggest popular answers, save answers, profile search, scoring system, report aggregation, and rules engine. One skilled in the relevant art, however, will recognize that the invention can be practiced without one or more of the specific details, or with other symbols, methods, etc. In other instances, well-known methods or techniques are not shown, or are not described in detail, to avoid obscuring aspects of the invention.

Definitions

Following are definitions used throughout the document:

Field—A single piece of information, corresponding to a particular question asked by the system, and further as shown in FIG. 39. Examples include, "City," "State," "Bonus Amount," "Skill," and "Job Title.

FieldGroup—A set of related Fields that form a logical grouping of information into a single record, and further as shown in FIG. 38. Also often referred to as a Question. Examples include "Salary"—a FieldGroup consisting of "Salary Amount," "Currency" and "Average Workweek." "Job Location" is a FieldGroup consisting of "City," "State," and "Country."

Survey—A set of FieldGroups asked in a particular order, and as further shown in FIG. 56. An administrator may fix the order, or the system may determine the order using the "Suggest FieldGroup" algorithm defined below.

AnswerValue (also Value, Answer or Attribute)—A value (piece of information) corresponding to a Field, used as a response. Examples include for the for field "City," AnswerValues could be "Seattle," "San Francisco," "Miami," and "Paris."

Profile—A set of FieldGroups, Fields, and AnswerValues that form a logical representation of an individual person or group of people, and further as shown in FIG. 42. Examples include "Industry=Finance, Job=Accountant, Employer-Name=Ernst & Young, Certification=CPA, Certification=CMA, Specialty=Taxation, Specialty=Cost Accounting, Years-In-Field=12, Salary-Amount=60,000, Salary-Currency=US Dollars, Salary-Workweek=40 Hours, Location-City=Baltimore, Location-State=Maryland, Location-Country=USA, School-Name=Princton, School-Degree=Masters, School-DegreeYear=1995, Age=43, etc."

Figure 17:
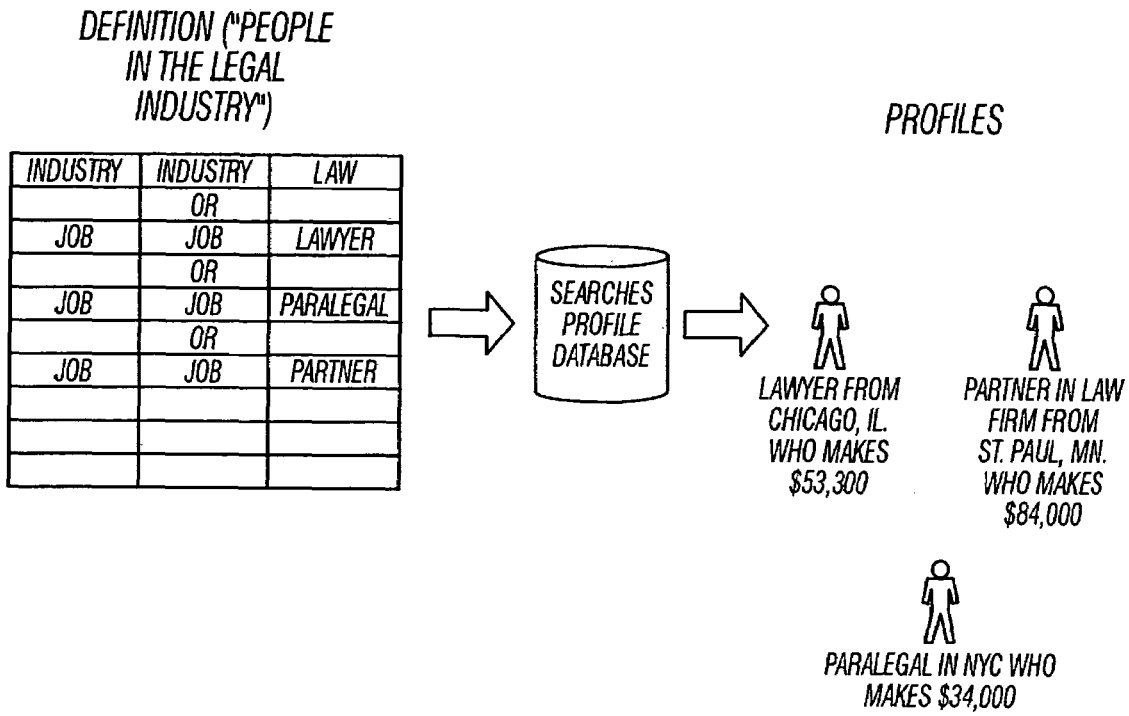
FIG. 17 is an example of an affinity group according to the invention.

Affinity Group (or Affinity)—A grouping of profiles that share common profile attributes, and further as shown in FIG. 17. An example is "All People who work in Law or Legal Professions."

Affinity Definition—A Boolean representation of the common attributes shared by an affinity group. Examples for "All People who work in Law or Legal Professions," the exemplary affinity definition include "Job=Lawyer OR Job=Attorney OR Job=District Court Judge or Industry=Legal OR Specialty=Trial Law OR etc."

Profile Search—A detailed set of criteria used for matching profiles to other profiles and creating a scoring system that ranks the validity of the match.

Profile Search Document—A document that encompasses the criteria defined for the profile search.

Chart—An aggregation of data limited to an affinity group, in a format understandable to an end user. An example is a Bar Chart for "Average Salary By Specialty."

Report—A set of charts combined in a specific layout to provide a detailed analysis of a profile search and comparison goal, as shown in FIGS. 20 through 36.

Overview

Every individual possesses unique distinguishing characteristics in their employment profile. These unique characteristics, even when seemingly minor, can correspond to differences in employment compensation. Being able to have a custom report that compares relevant characteristics for each individual, and having an understanding of what the market is willing to pay for the individual's abilities based on such comparison, is an important step in finding and effectively negotiating employment opportunities as well as making informed career decisions. The method and apparatus presented herein provide comparative compensation reports based on characteristics determined through a survey and a scored-attribute-matching search and reporting process.

Figure 1:
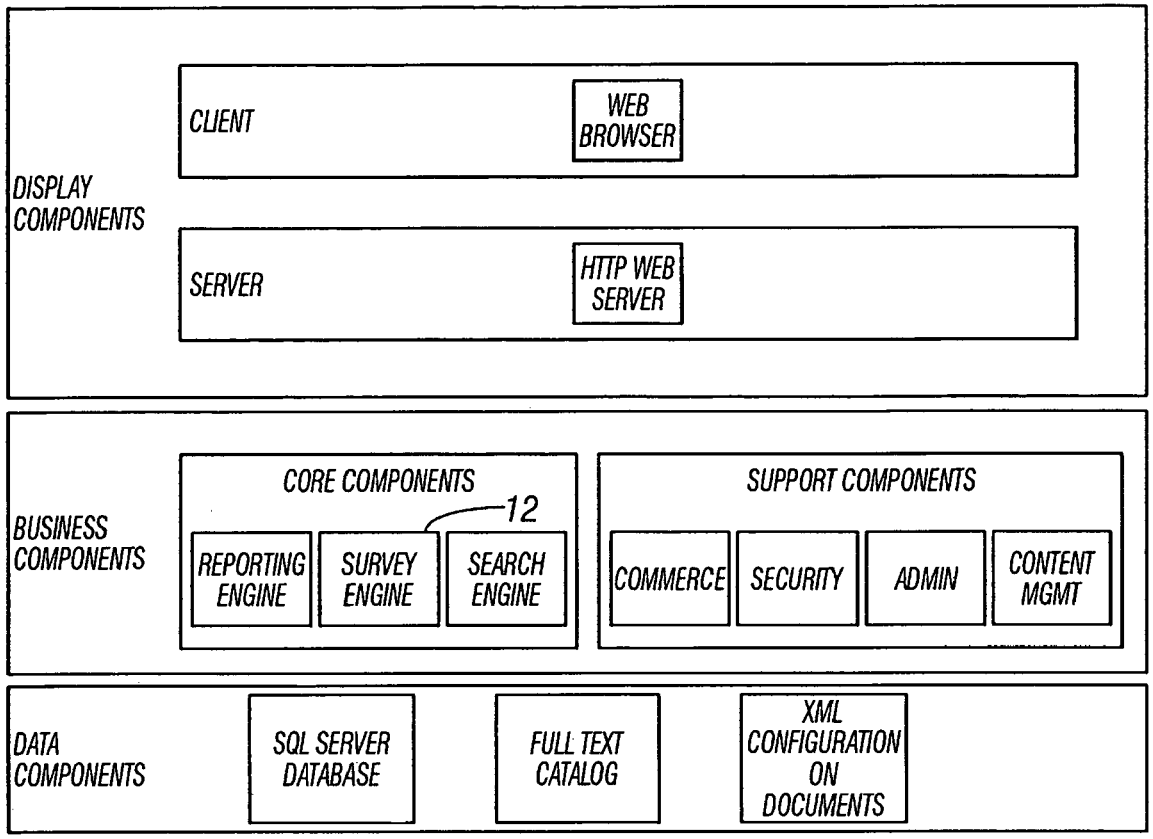
FIG. 1 is an overview of a website implementation of a system according to the invention.
Figure 2:
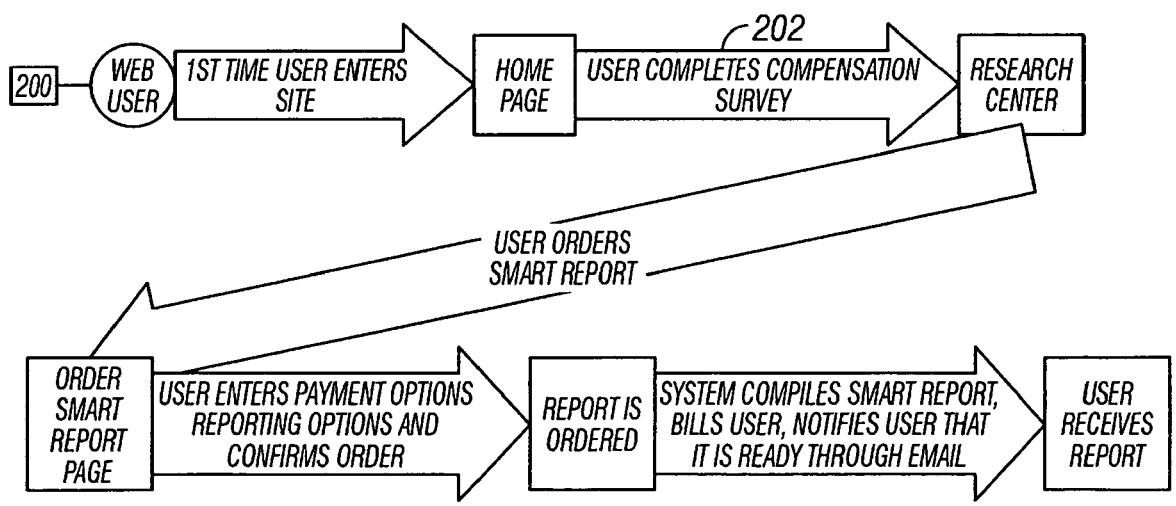
FIG. 2 is a general user flow through the system according to the invention.
Figure 3:
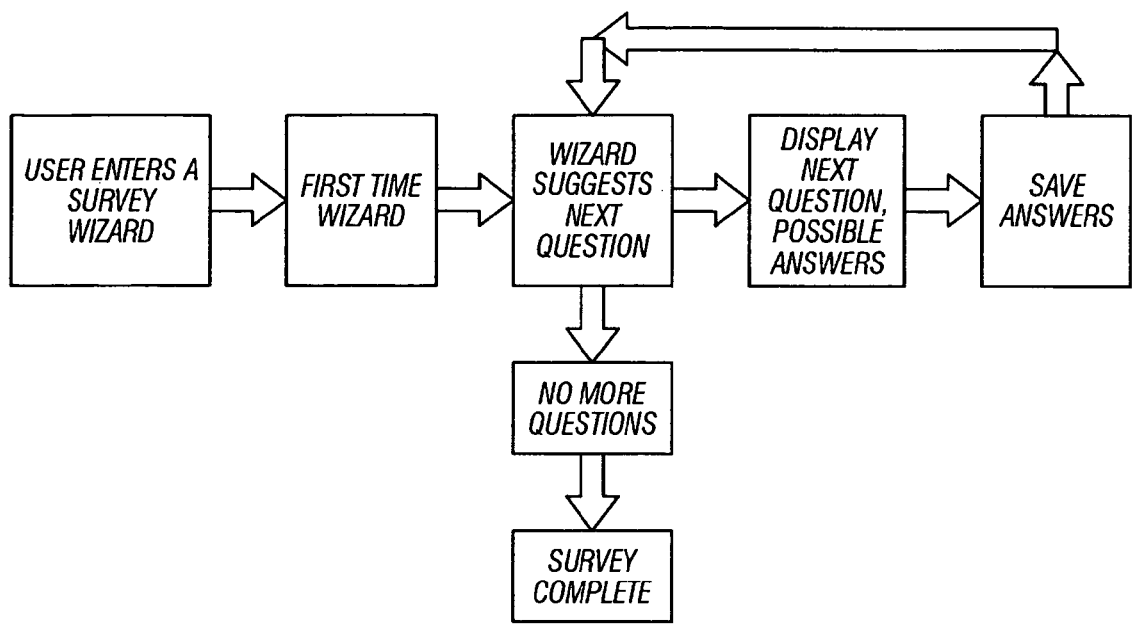
FIG. 3 is a specific user flow for the first time a user accesses the system according to the invention.

Reference is now made to FIG. 2 where a general user flow through the system is shown. A user begins the investigation of their worth (200) by accessing an Internet Web site through a user interface, such as a personal computer, personal data assistant, or similar device (FIG. 1). Once access has been established, the user conveys to the system desired compensation comparison objectives/goals (202), as shown in FIG. 2. Once the objectives have been identified a survey engine (also referred to as survey wizard, see FIG. 3) 12 (FIG. 1) begins identifying the unique characteristics of the user that are most applicable to determining a compensation level, as shown in FIG. 21. The survey engine uses a combination of open and closed FieldGroups to create an individual profile. An open FieldGroup is defined as having at least one Field for which the user may enter an answer in free text. A closed FieldGroup is defined as having a Fields for which the user may only select from a list of predefined choices. After each FieldGroup is answered during the survey process, the individual profile is associated with one or more affinity groups. The affinity groups are discrete groupings of individual profiles based on Boolean criteria. The Boolean criteria, either simple or complex, are based on a combination of values from one or more attributes on a profile, such as job, skill, location, etc. A user's profile attributes are compared against each affinity definition and, if the profile attribute meets the affinity definition criteria, the user is considered to be a member of that affinity group. For example, a user may be considered part of the affinity group "People in Information Technology/Computer Networking" if they have answered having certain skills, such as Skill=TCP/IP or Skill=Cisco Routers or Skill=Windows NT Networking or Certification=Microsoft Certified Systems Engineer.

Figure 4:
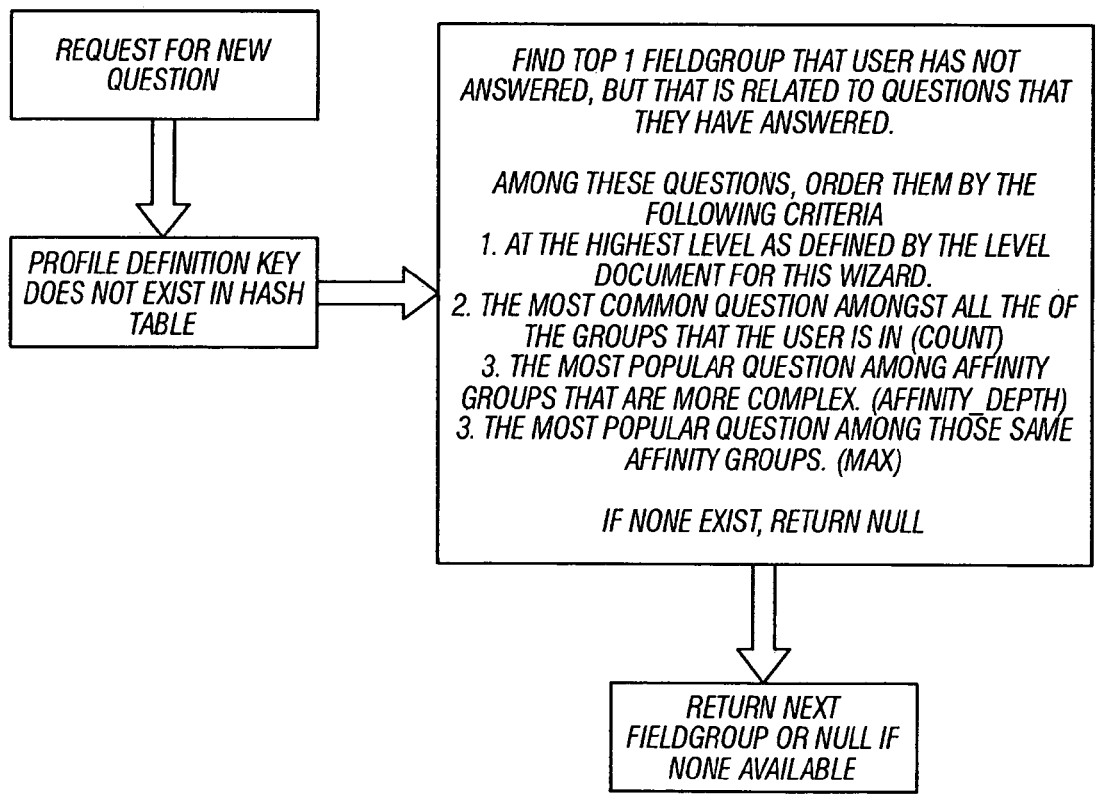
FIG. 4 is a flow for the system to suggest a FieldGroup to a user according to the invention.
Figure 7:
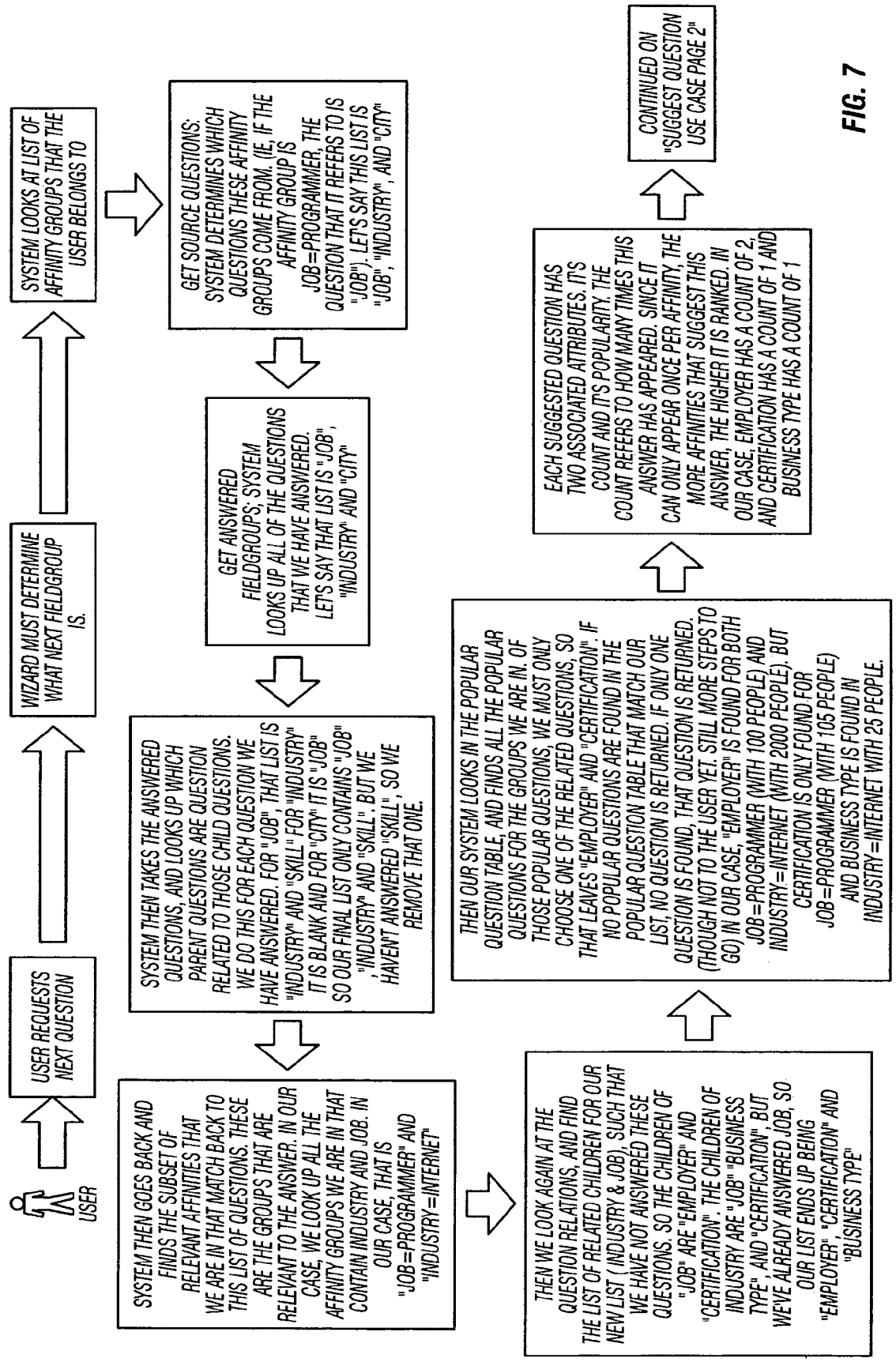
FIG. 7 is an example of the system suggesting a FieldGroup in a survey according to the invention.
Figure 8:
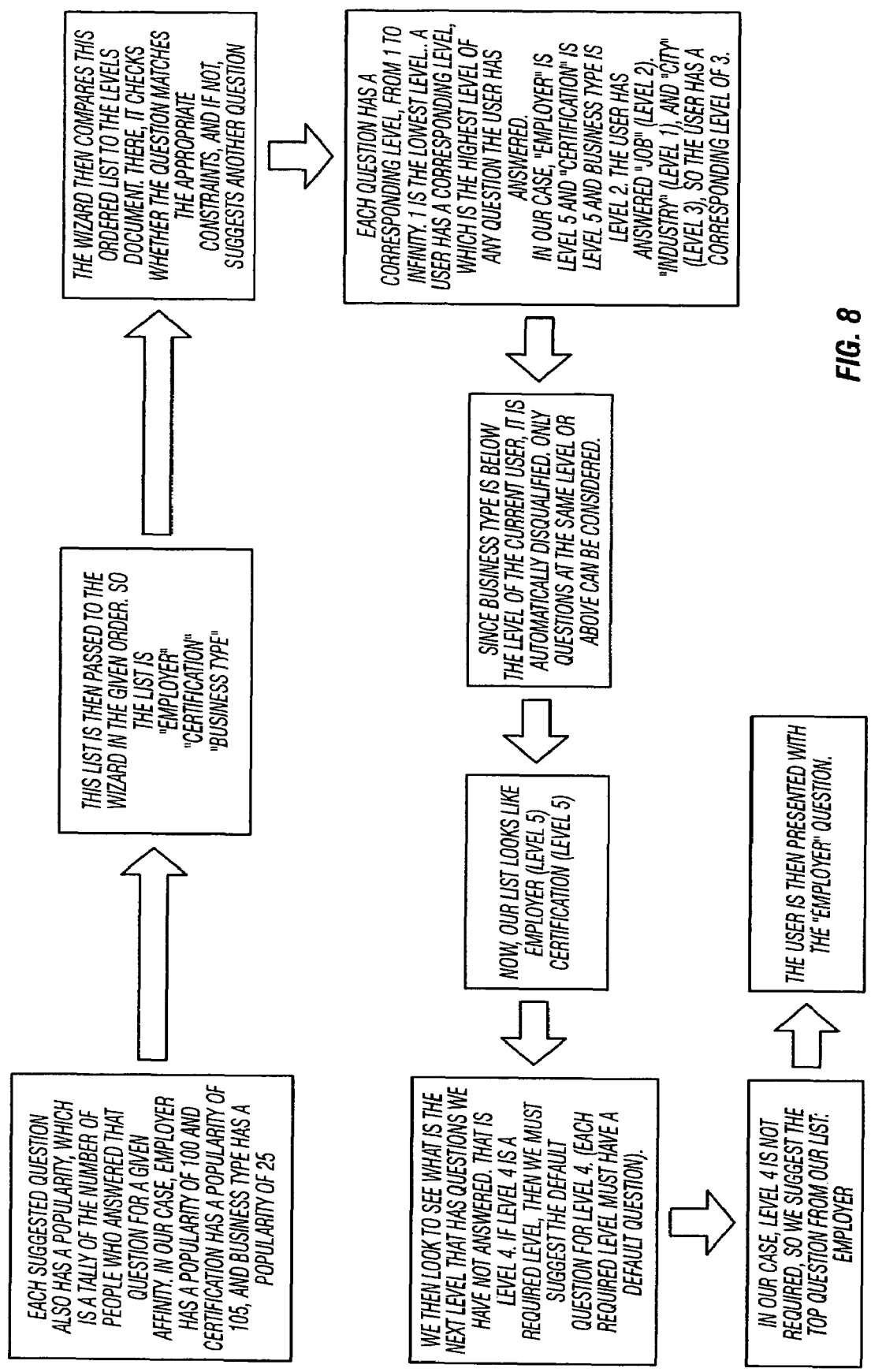
FIG. 8 is a continuation of the example shown in FIG. 7 according to the invention.

The survey engine, through iteration, asks FieldGroups shown in FIG. 21 of the user until the engine determines no more FieldGroups should be asked. Upon beginning the survey process, the user's objectives/goals are confirmed through an initial set of questions. The goal establishes broad areas that should be investigated by the survey engine. The engine, using this goal, suggests the next FieldGroup (Question) to be posed to the user, from the set of all available FieldGroups in the system shown in FIG. 4. The FieldGroup along, with possible popular answers obtained from previous questioning of different users, are presented to the user as shown in FIGS. 21 through 23. The system examines the answer offered by the user and, if appropriate, saves it in a database as shown in FIG. 5. This process continues until the engine determines that the desired goal has been ascertained and no more FieldGroups need to be asked. The engine queries if any more goals need to be examined returning the process to establishing a goal for Questioning. The process continues as described herein until profile data for all the applicable goals are created and the survey is complete.

Reference is now made to FIG. 40 where a specification for an affinity definition is shown. The system uses a concept called "affinities" or "affinity groups" to categorize and group users in many segments of the application. An affinity group is defined as a group of profiles defined by a set of profile criteria, called an affinity definition. Affinity definitions are a combination of values from fields defined in the system also shown in FIG. 6. For example, Job="Human Resource Manager" is an affinity definition for the affinity group consisting of all the profiles such that users answered Job="Human Resources Manager." Criteria can be logically defined to create more complex criteria, using standard Boolean operators, such as AND and OR. For example, the affinity group called "San Francisco Java Programmers" might have the following affinity definition: "City=San Francisco AND (Job=Software Programmer or Job=Software Developer or Job=Web Developer) AND Skill=Java." The corresponding set of profiles that match this definition is the affinity group. The affinity definition is stored in a relational format, which is easily and quickly retrievable, and searchable. One skilled in the art would recognize that such a definition could be stored in a wide variety of formats suitable to the task at hand, or modified for improved CPU performance. A program quickly compares the user's profile and compares it to all affinity definitions stored in the system to determine to which affinity groups a user belongs. One skilled in the art would be able to recognize that more complicated affinities are possible, using more complex Boolean logic, such as NOT, XOR, etc. Additionally, affinities can be created which group numeric data by ranges. For instance, all people in a certain age range could be grouped together. Affinities are associations of data, defined by a human, an administrator, or users, which allow the system to create a more intelligent output for use by many of the sub-systems described herein.

The survey engine is required to ask FieldGroups that are relevant for a particular user. Many different job profiles have different attributes that affect one's compensation. For example, a CEO may need an answer to the FieldGroup (question) Company Revenue in his/her profile, while a Lawyer might need Practice Area or Bar Association Memberships. The suggest FieldGroup algorithm is designed to ask pertinent questions of the user depending on the user's compensation analysis goal and the type of profile the user has, learned through iterative questioning. Open-text questions provide a unique challenge in automated systems because an administrator cannot anticipate them. For instance, prior art would allow for a selection of an industry from a drop-down list box containing a set of known values. Because all industries would be known to the system, logic could be added to recommend a new question based upon the answer to the previous question. In such a system, a complex decision tree is created in advance, and the system is able to create a custom survey based upon the answers given by the user. However, these systems are subject to the limitation of knowing all possible answers, and spending a significant amount of labor to program the decision tree to account for all possibilities. It also makes it very difficult to add new questions because the added responsibility of mapping each answer to the decision tree must be part of the process. The invention described herein is not subject to such limitations because it allows the entry by users of any answer, as further shown in FIG. 23. Typically, this open-ended question is enabled by a text box with few restrictions on what can be entered, versus a drop down box, where a user must select one of the pre-defined answers.

Because the system allows open-ended text answers, a standard expert system is not possible, as it is impossible to create a decision tree for an infinite number of questions that would make up a survey. In such situations in other art, an artificial intelligence mechanism is usually employed to deal with the unknown variances in user input concerning which questions the users answer, as well as what those answers are. The invention requires that a high degree of recall is maintained, which means a new user coming and using the system with the same set of profile data as an existing user should have the same set of FieldGroups recommended in the same order (deterministic). To accommodate these requirements, i.e., both recall and variability, the system defines relationships between FieldGroups, as further shown in FIG. 58, a minimum set of required FieldGroups, as further shown in FIG. 55, and an order that the FieldGroups appears during the survey, as further shown in FIG. 59. These system rules are combined with a set of weights and a subsystem which allows a qualified guess as to which FieldGroups should be suggested next, without requiring a predefined survey for each unique type of job profile.

To pick the next FieldGroup to be asked of the user, the survey engine selects the most popular FieldGroup that the user has not yet answered but that is related to the FieldGroups already posed to the user, and which is also contained in the profiles of the affinity group(s) to which the user currently belongs, subject to the level constraints and FieldGroup relationships described herein. An administrator establishes the relationships and levels for FieldGroups previous to a user completing the survey. As explained earlier, the system uses a collaborative filtering architecture for the survey engine, to allow for a large number of FieldGroups, and minimal administrative input. Although a collaborative filtering architecture is used, an alternative architecture, such as a neural network can also be employed. Administrative tasks related to Suggesting FieldGroups are limited to cleaning input data that are used to teach the system, defining FieldGroup Relations, as shown in FIG. 58, defining FieldGroup Levels, as shown in FIG. 59, and defining affinity groups.

The inputs to the survey engine are a user's previous answers as shown in FIG. 28, affinity groups as shown in FIG. 17, relationships between FieldGroups (FieldGroup relations document) as shown in FIG. 58, FieldGroup levels (or FieldGroup priority), and a triplet called "Popular FieldGroups," that consists of an affinity group, a FieldGroup, and a weighted value. The output for the survey engine is a single suggested FieldGroup. The constraints in the suggested FieldGroup system consist of FieldGroup levels or priorities as shown in FIG. 59 and defaults. The survey wizard prioritizes the related FieldGroups by first selecting FieldGroups that possess the highest level (or priority) as defined by a level document for the particular wizard or broad goal. Each FieldGroup is assigned one and only one level per wizard. Each level is assigned as a positive integer value to a FieldGroup, with lower levels constraining FieldGroups to appear earlier in the survey, and higher levels constraining the FieldGroup to appear later in the survey. This ensures that certain FieldGroups appear at or near the beginning of the survey and other FieldGroups appear at or near the end. Additionally, the level document also groups FieldGroups together in each level, and assigns one FieldGroup from the group as a default FieldGroup, so that if an administrator wanted to ensure that at least one FieldGroup out of a group of FieldGroups is always asked, it is asked if no other FieldGroup from that level is asked. For instance, there may be two separate FieldGroups, "Job" and "Position." Position may be a specialized type of job, which would be appropriate to ask in certain industries, such as for a professional baseball player. In that case, "job" need not be asked because that information is captured in the "position" Fieldgroup. For the most part, most profiles only need to answer "job," whereas in specialized cases they may need to answer alternate FieldGroups such as "position." Therefore "job" and "position" are grouped, and "job" is set by an administrator as the "default" FieldGroup because the system requires that if people do not answer any other job-like question they must answer job.

The weighted values on the Popular FieldGroups triplet are stored in a relational format. The weights represent each FieldGroup's popularity. This is defined as the number of profiles for each affinity group that have answers for that FieldGroup. Popularity is calculated by tallying up, for each FieldGroup, the number of users who have answered that FieldGroup for each affinity group, and an association between an affinity, a FieldGroup, and a popularity, and is stored in a relational table. By this mechanism, a feedback loop is created between the user's profile questions and answers, and the survey wizard. As user profiles are entered into the system via the survey process, new associations of similar profiles are produced and those results are integrated into the popularity of each corresponding Fieldgroup, yielding a subsequently more and more precise survey for differing types of job profiles.

Constraints, as shown in FIG. 59, are generally applied to the system based upon naturally occurring relationships between FieldGroups as they pertain to job profiles in general. For example, it is assumed that the existence of certain FieldGroups presupposes other FieldGroups. A human administrator with expertise in the domain defines these relationships based upon domain knowledge. Because the number of relations between FieldGroups is far fewer than the number of unique survey possibilities, it is efficient for an expert to define these relations, even if there are hundreds of FieldGroups. For instance, a FieldGroup such as "Bar Association" (generally used for lawyers and profiles requiring a legal degree) would only be asked if we knew the user's "Job," or perhaps their "Industry," but it would be pointless to ask that FieldGroup if only the user's "Gender" were known. As such, a FieldGroup such as "Bar Association" is related to "Job" and "Industry," but not to "Gender." Relations such as these are referred to in the system as "FieldGroup Related," and are stored in the system using a relational format. In addition to the levels, these relations act as constraints on the determination of the output of the suggest FieldGroup.

Given the constraints and weights that are resident in the system, the survey engine selects amongst all the FieldGroups available for the survey the FieldGroup that is the most popular (or highest weighted) FieldGroup among the affinity groups to which the user belongs, constrained by the levels and FieldGroup relations described previously. Finally, the FieldGroup is forwarded to the user for presentation. The user answers it, and the process is repeated for subsequent questions. If, after iteration, a FieldGroup no longer can be suggested that meets the criteria discussed herein, the system marks the users survey as complete and takes a pre-defined next action, such as showing a message to the user and moving on to the reporting aspects of the system as shown in FIG. 26.

Figure 9:
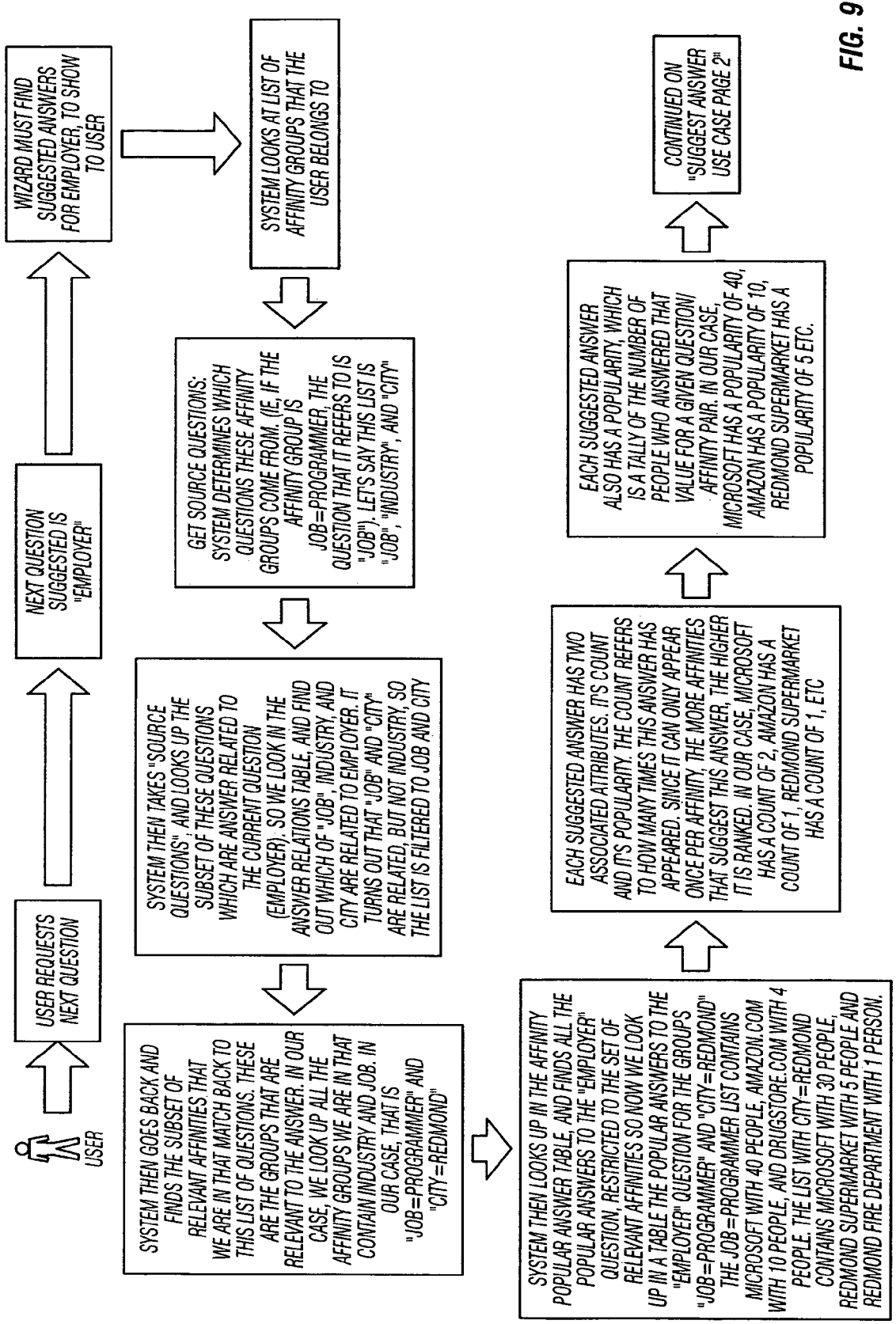
FIG. 9 is an example of the system suggesting popular answers for a FieldGroup, in the survey according to the invention.
Figure 10:
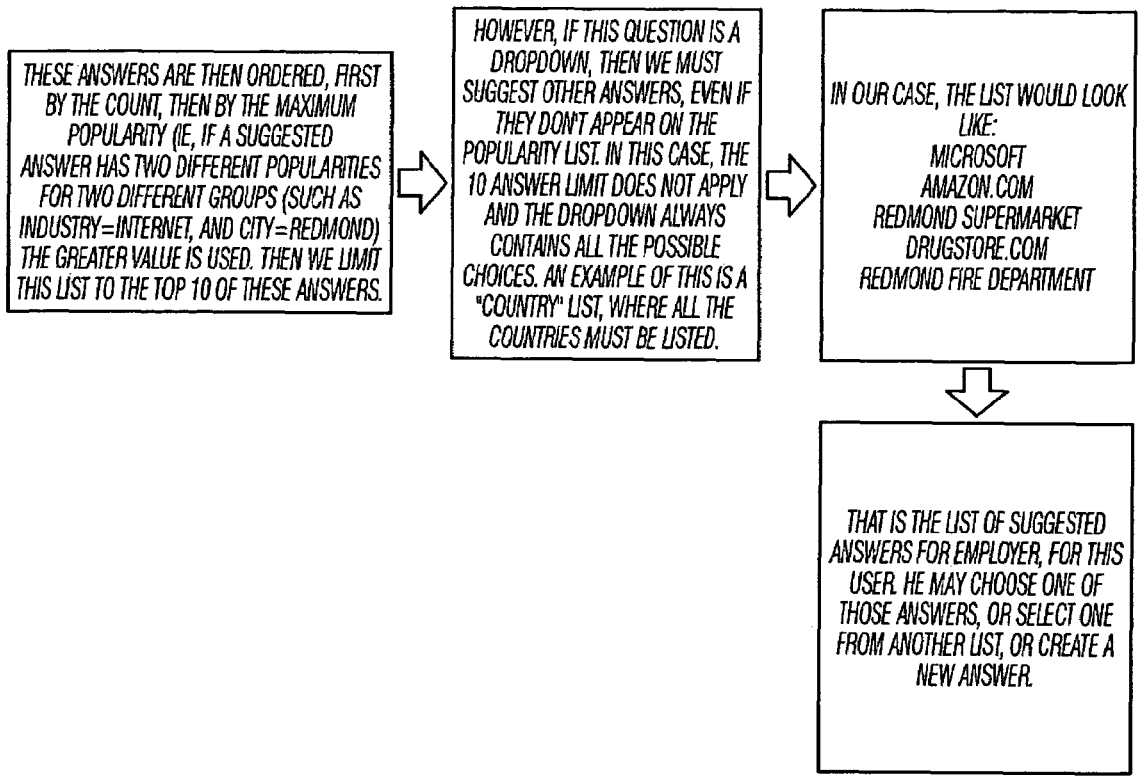
FIG. 10 is a continuation of the example shown in FIG. 9 according to the invention.
Figure 11:
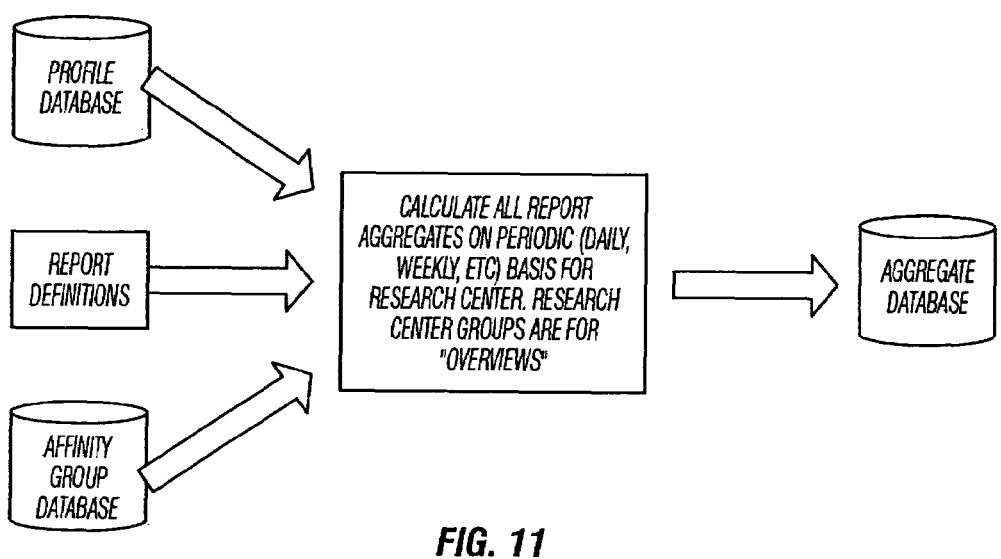
FIG. 11 is a flow for calculating and summarizing data according to the invention.
Figure 12:
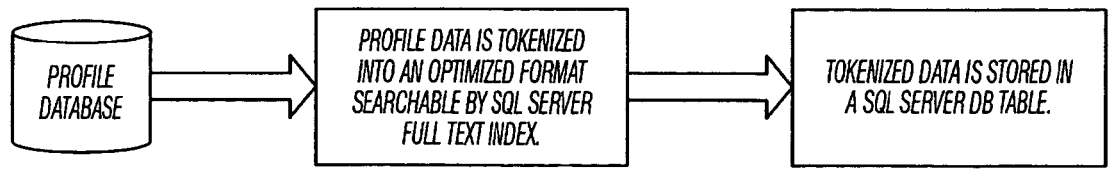
FIG. 12 is a flow for storing tokenized data in a database according to the invention.
Figure 13:
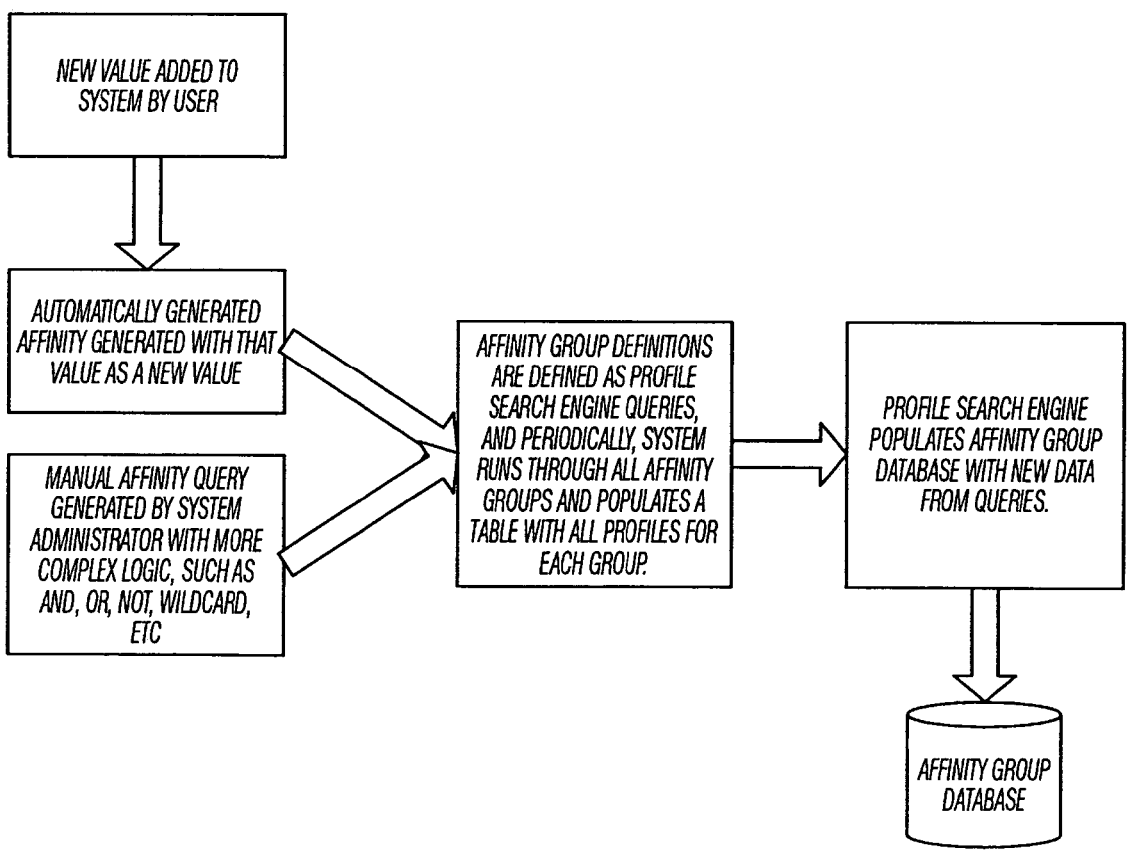
FIG. 13 is a flow for populating an affinity group according to the invention.

Reference is now made to FIGS. 9-10 that show a non-limiting example of the system suggesting popular answers for a FieldGroup in the survey. A mechanism exists in the system, which suggests possible answer choices for a particular FieldGroup, based upon several factors. These factors are, for example, the FieldGroup being asked, an answer relations document, the user's profile and associated affinity groups, and a set of weights, which store the most popular answers for a particular FieldGroup. Just as there is a relational basis between FieldGroups asked during the survey process, one aspect of the survey engine establishes a relationship between a particular FieldGroup and the suggested answers as shown in FIG. 57. A particular FieldGroup is answer related to another FieldGroup if the answer to the first FieldGroup causes popular answers for the second FieldGroup to be suggested.

The 'suggest popular answers' algorithm is constrained by the answer relations, and the answer values are weighted using a table consisting of a list of associations between a value, an affinity group, and the number of profiles who have answered that particular value. Among the constrained answers, the survey engine selects the X most popular (most highly weighted) answers among the list, where X is an integer defined by an administrator as a reasonable number of values to display, from which a user may select.

For example if a survey begins with a FieldGroup for Industry, and the FieldGroup is displayed, which asks the user about the Industry in which they work, and they respond "law," a second FieldGroup for Law Firm, based on the process described earlier for suggested questions, is displayed and the user is asked with which law firm they are associated. Based on the Suggest Popular Answers algorithm, the engine can also provide a list of law firms that were previously provided by other users to this FieldGroup, based on those who also identified themselves in the "law" Industry. The affinity group Industry="law" is, therefore, answer related to the FieldGroup for Law Firm because the suggested answers for the FieldGroup Law Firm are related to the answer provided by the first FieldGroup Industry. Correspondingly, for the FieldGroup Law Firm the system looks up all other Field-Groups that are answer-related to it. For example, the type of job (FieldGroup for Job) may be answer related to the affinity group associated with law firms, as may be the FieldGroup for "total hours billed per year," etc. Therefore, because Field-Group Job may be answer-related to FieldGroup Industry and FieldGroup Law Firm, the system suggests to the user to select his type of job from a list that includes corporate attorney, litigation attorney, paralegal, and so forth. While, if the user had answered "Computer Software" for the FieldGroup Industry, then the system would have suggested different possible answers for FieldGroup Job, such as computer programmer, senior software engineer, IT support technician, etc. Alternatively, instead of using the suggested popular answers, the user may enter a new value, and input a job title that is completely new to the system. Based on the user's responses, the system categorizes the users profile and aligns it with profiles that possess similar characteristics.

When the survey wizard displays a question, one aspect is to determine if the FieldGroup is an open FieldGroup, supporting open-text answers. An open FieldGroup is one that allows for free text entries by a user, as opposed to a closed FieldGroup, where a user may only select values from a list or use numeric answers. If the FieldGroup is in an open format, the user may type a open-text answer, or select a suggested popular answer, as described previously. When the user has made their entry, the system determines if the answer was typed as open-text or selected from the list of possible answers. If the answer is selected from a list of suggested answers, the users choice is saved in a database using the existing Answer ID for that existing answer in the system. If the answer was free/open-text, an algorithm is invoked to determine if the answer already exists in the database in a similar form to the users free-text entry. Using search technology, possible existing alternatives from the database are suggested that possess similar characteristics as the free-text answer, as shown in FIG. 22. The alternative responses may possess different spelling of key words, grammatical variations, or combinations of other synonymous words. By doing this, the survey wizard identifies the underlying focus of the new answer and ensures that the system is gaining the right perspective from the user. If the user rejects the suggested alternatives, the system requests that the user retype the answer to confirm the response, and possibly enter more information about the answers, so that the system or an administrator may categorize the new answer. Once the user confirms the response by typing it a second time, the new answer is saved in the database and it becomes one of the possible answers that subsequent users may choose, as shown in FIG. 28.

An administrator, or automated program, can also verify that any new answers are qualified values, such as not containing swear-words or other anomalies. An automated program may exist which uses a dictionary, or other software that can verify the validity of the value. If instead of a new open-text answer, the user selects one of the alternative responses, the selected answer is saved in the database using the existing Answer ID for that answer. Occasionally, the FieldGroup presented to the user is not of an open format, such as a small list of possible responses that do not change (are not open), or a numeric value, such as a salary figure, or a date, or Boolean values such as Yes/No, as further shown in FIG. 25. In numeric or date situations, there are bounds defined as well for answers. If the answer to the FieldGroup fits into the bounds of the FieldGroup definition, the user's response is saved in the database. For instance, if the user is answering a date field, the date may be required to be within a certain range, or if a salary, it must be greater than '0.' If the answer to this closed form of FieldGroup is not within the bounds of the FieldGroup definition, an error message is sent to the user asking for clarification or re-input of the answer. Ultimately, the users profile is saved and cataloged in a database that allows the system to correlate it with other affinity groups and other user profiles to provide a comprehensive compensation report.

Figure 16:
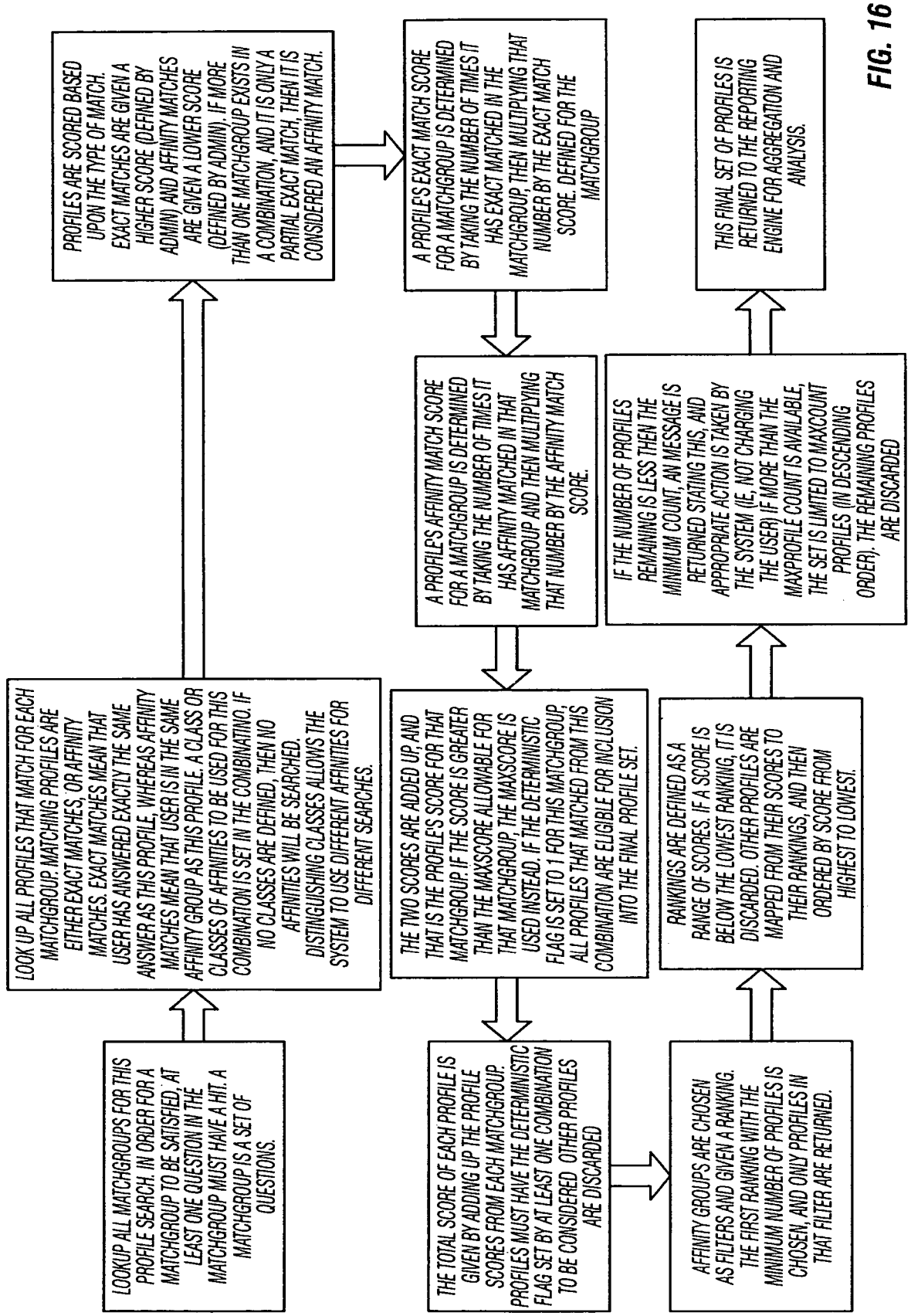
FIG. 16 is a flow for a profile search according to the invention.

Reference is now made to FIG. 16 where a flow for a profile search is shown. One aspect of the invention concerns comparing an individual profile to all other profiles in the system, and determining which of these profiles are most similar. The Profile Search algorithm returns a list of similar profiles. This similar list of profiles are then summarized, and aggregated into a readable report that offers a complex analysis of a user's compensation and career opportunities. This functionality allows the system to return an in-depth customized report consisting of analysis of similar profiles, in real time. It represents a more accurate picture of a user's compensation than a broad survey could, or one done by human analysts, or based only on job titles, or a standard expert system, etc. The Profile Search algorithm runs, which returns a list of profiles to which the user's profile matches most closely to the search goal. Profiles are retrieved from the database as a set of FieldGroup#,Field#,AnswerValue triplets. The system encapsulates and defines similarity between profiles by use of a scoring mechanism. The scoring mechanism is generic in nature, and can apply to any attribute of a profile that has been defined in the system. It is important to note that different types of similarity can be established by the system. This allows different search goals to be executed. For example, a user may wish to know what projected salary they may expect to make in the marketplace, in their particular occupation, with the all other attributes, such as experience, location and industry, being similar. This is a common scenario for individuals wishing to switch jobs. The invention supports this type of analysis using a pre-defined search goal document, as shown in FIG. 50, which specifies that the user's profile is to be compared to a set of profiles that have similar jobs, in the same area, industry, etc. In another variation, a user may wish to know what other different jobs for which they may be qualified, given their skills, experience, location, etc. In this case a different search goal is defined for this type of analysis.

Figure 15:
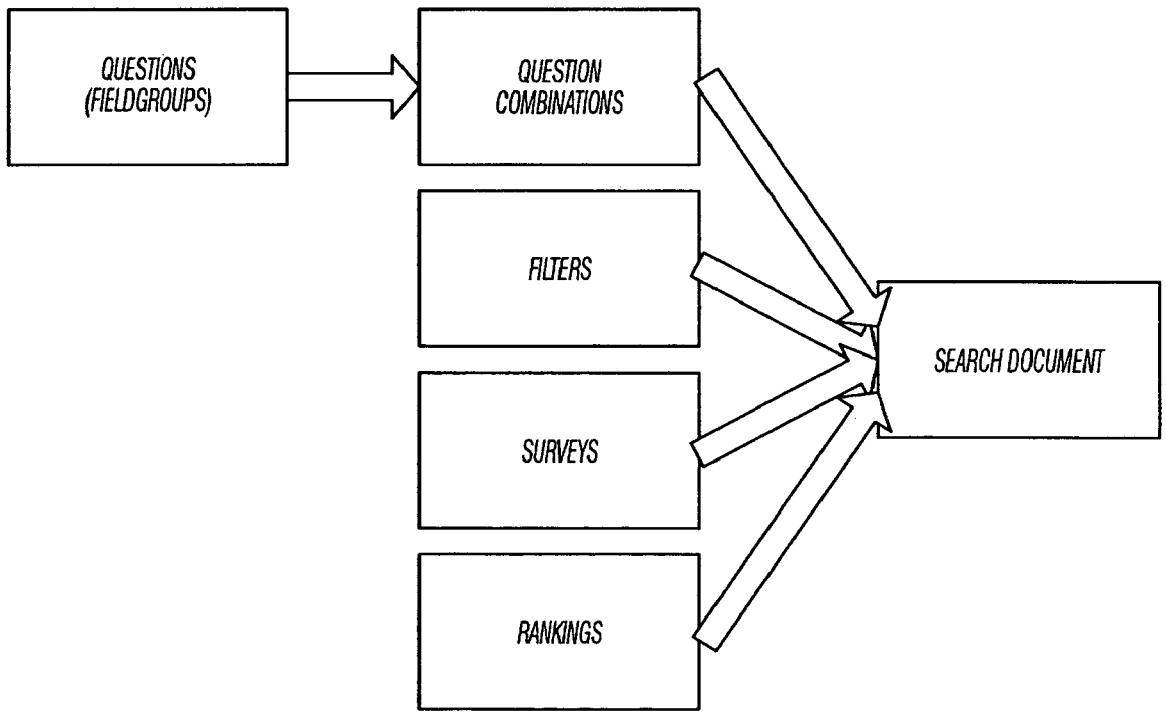
FIG. 15 is an overview of the different aspects of a profile search according to the invention.

Reference is now made to FIGS. 15 and 60, where a profile search scoring system is shown. To encapsulate each type of search goal, a search system is defined according to a relational structure, using a scoring and filtering system. In this scoring system, both exact matches are considered, as well as affinity matches. The affinity matches, although scored lower than exact matches, are critical to the system because they allow for a wide variety of similar attributes to be grouped together, and compared in a more natural way. This solves a critical problem in this area of invention, i.e., previous incarnations of occupational comparison systems require exact matches and, hence, lose much of their value because a large percentage of real world profiles that are similar do not usually have values with exact matches, or the number of true variations is much higher than is usually accounted for in fixed reporting systems. For instance, an IRS auditor may wish to be compared to an accountant, but because they have different job titles, they may never be compared in other systems. In this implementation, affinities (as described elsewhere) are constantly being added and updated through manual and automated processes, which can link these values together and return similar profiles.

When a profile search is requested, the search goal definition document for the search is retrieved. It specifies rules for how profile attributes are to be matched and compared. The user's profile is then compared to all other profiles in the system, and each matching value from the profiles is assigned a score determined by the field in which it matches. For instance, exact matches on the FieldGroup "job" are assigned a certain relatively high score. An affinity match, i.e., "All People with Accounting Jobs," is also considered because these matches are similar but not exactly the same. Because of this, these matches are given a slightly lower score. Each profile is then scored based on all of its affinity and value matches, and the score is totaled up, by summing up the individual scores. One skilled in the art can understand that many different types of search goals and match criteria can be defined, depending on the type of FieldGroup. The FieldGroup for "Job" is just one kind. For example, other match scores can be defined for Skills, Specialties, and Certifications, and combined with scores for Job, to create very accurate rankings of profiles returned in the search to meet a given search goal. To be returned for a search (qualify), a profile must meet a certain overall threshold score, which is predefined by an administrator as part of the search goal document. Additionally, the profile must contain matches on specific deterministic fields. The threshold score removes any profiles that do not match on enough attributes to be considered a high quality match. For instance, it is possible that a profile matches on many non-deterministic values, such as gender, geographic location, or experience level, but does not match on something that is critical (or deterministic), such as job type or specialty. An accountant may live next to an attorney, in the same age range, in the same community, who went to the same college, but they should not be considered matches because they are in different jobs and different job affinities. Therefore, in one type of search goal, only certain fields and affinities, such as those related to the job or specialty, are considered deterministic enough to be considered for matches. Again, one skilled in the art will understand that while Job and Skill are considered highly deterministic for basic compensation analysis, the system could be employed for other types of analysis where possibly other FieldGroups such as Location or Gender, might be specified as highly deterministic instead. This allows for the definition and automation of many kinds of reports meeting many different profile search goals.

Additionally, some combinations of attribute matches may be considered more valuable than other combinations. For instance, it may be preferable to match a smaller subset of profiles for which a location is closer to the target profile. By employing matchgroups within the profile search goal document, sets of matches can also be ranked. This is useful for instance in ranking profiles higher where geographic proximity is desirable. By creating a set of affinities, described elsewhere, that group together profiles by regions, the profile search system using matchgroups is able to target profiles within local regions first, ranking them higher than profiles that meet other match criteria but are in outlying regions. For instance, the search goal may wish first to find only profiles in the same or surrounding cities. By defining metropolitan region affinity groups, people in the same metropolitan region are found. However, there may not be enough valid data in the system to find profiles in the same metropolitan region, and therefore, it is also necessary to consider profiles from a larger surrounding region, such as a state, or multi-state area, and choose them if necessary. By including affinities in a ranked fashion in matchgroups, it is possible to return profiles that are closest to a user's by having them rank the highest. One skilled in the art would recognize that closeness could apply to any attribute of a profile in addition to location, such as experience level or age ranges.

Figure 14:
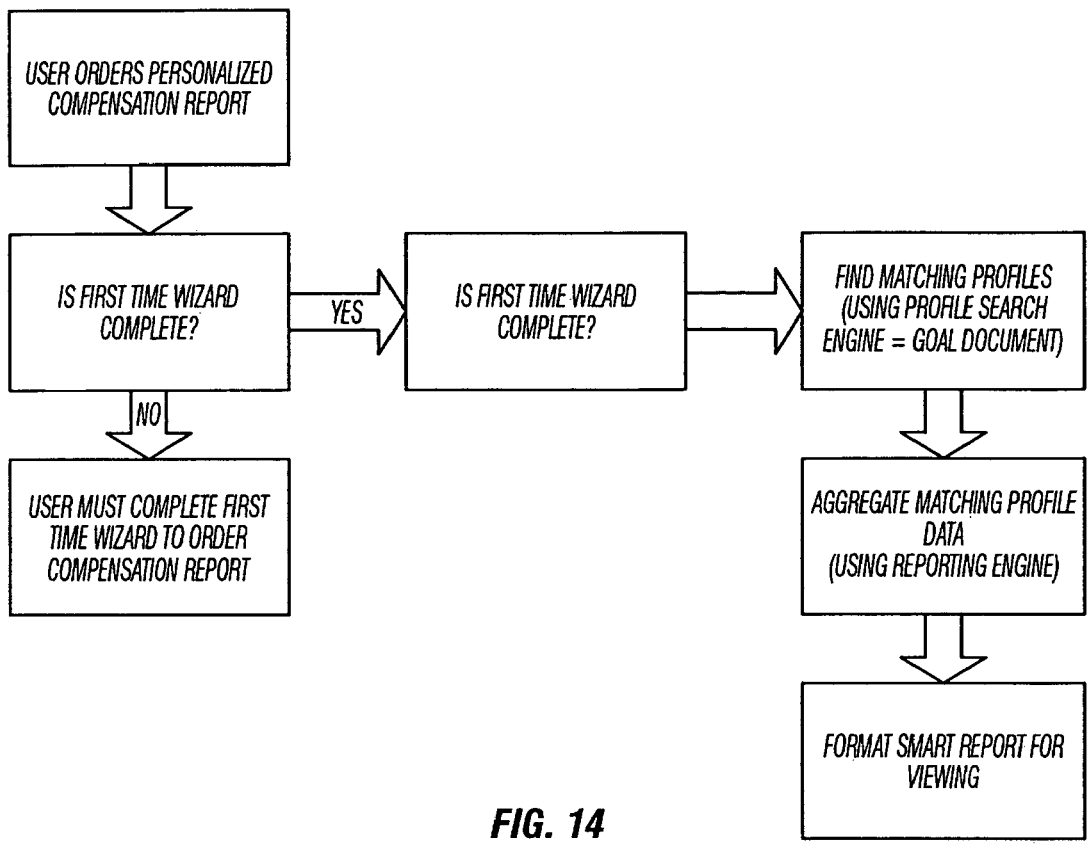
FIG. 14 is a flow for generating a custom report for a user according to the invention.

Reference is now made to FIG. 14 where another aspect of the invention, a set of profiles (usually, but not necessarily, retrieved via the profile search subsystem described elsewhere) is aggregated and their individual attributes are automatically summarized into calculations, such as averages, medians, standard deviations, and counts. The calculations are aggregated for fast real-time retrieval. Aggregate definitions define dimensions, such as skill, and measures, such as salary, into an aggregate, such as "average salary by skill." Additionally, the system can summarize values into predetermined ranges, such as salary ranges or age ranges. A report chart format defines how charts are displayed to an end user. Many different formats, such as HTML, PDF or JPEG exist. The report output format may be adjusted to work with any of these formats and these charts may be displayed as bar charts, pie charts, etc.

An administrator defines an aggregate definition, as shown in FIG. 41, in an XML format, consisting of measure, a dimension, and a name. Each aggregate is calculated over an affinity group or groups. For example, after a profile search is executed, the list of resultant profiles is combined into an affinity group, such as "People Meeting Search Goal X for User Y," and all available report definitions are executed, resulting in numerous aggregations. Each aggregate definition must contain a measure, a dimension, or both. If no measure is specified, the aggregate is calculated as a count over the entire dimension. If no dimension is specified, the average, 25th, 50th, 75th median, standard deviation, and standard error, etc, are calculated over the entire population using standard algorithms. Aggregates for any affinity group can be calculated using this method. Using this method allows fast retrieval of aggregate information, and easy definition of new aggregations, which are available to any of thousands of affinity groups defined in the system.

Because hundreds of aggregate definitions are available over thousands of affinity groups, it is impossible to present all of this data to a human in a format which they could easily and quickly understand. The resulting data would consume thousands of pages. To solve this problem, the invention groups aggregations into charts and groups, and filters and arranges the charts in a layout which is understandable and useful to a human. Only charts that have enough data, and that are determined to be applicable to the user's profile, are shown to the user. This allows for many reports that are only applicable to certain groups to be shown at any time, without having to predefine a report for any particular group. For instance, a group named "Pay Influencers" might contain the following charts: "Average Salary by Job," "Average Salary By Practice Area," "Average Salary By Teaching Rank," "Average Salary By Skill," "Average Salary By Experience," "Average Billing Rate by Bar Association," etc. But not all of the charts in this group are displayed, depending on the applicability to the user's profile. For example, the chart "Average Salary By Teaching Rank" is not displayed if the report is for a lawyer's profile. Another group named "Geographic Outlook" might contain charts such as "Average Salary By City," and "Average Salary By State."

Charts are grouped into logical sections, as shown in FIGS. 29 through 35, that are recognizable to a human, and the system renders the charts in a grouped layout, in an understandable, cohesive, readable presentation. For a particular set of similar profiles, there are many charts that are defined according to a report specification, as shown in FIG. 44. A series of charts are combined into a group, as shown in FIG. 45, which is then parsed and formatted by a program into a user readable format, such as HTML.

For instance, a lawyer's profile may have matched to many other attorneys, all who have answered a FieldGroup for Bar Association and a FieldGroup for Hourly Billing Rate. The compiled report for the lawyer can automatically show a chart for "Average Billing Rate by Bar Association," whereas a report for a High School Teachers would not show this chart because no matching profiles have either answered the "Bar Association" FieldGroup or the "Hourly Billing Rate" FieldGroup. This is an important innovation over previous inventions, which are restricted to returning generic assessments that group individuals into large, often useless, categorizations while ignoring subtler, yet far more useful categorizations.

Different embodiments of Report Aggregation and Display exist in the system. "The PayScale Report," as shown in FIGS. 29 through 35, is an example of a report aggregation that uses a profile search to define an affinity group for a particular user, which is then aggregated and displayed according to the logic described herein. The Research Center shown in FIG. 36 is an example of report aggregation and display that uses affinity groups that are defined by affinity definitions, and apply as a general overview of thousands of career related topics. The Profile Alerts shown in FIG. 37 are an example of report aggregation and display that measures similar profile compensation data over time.

Figure 18:
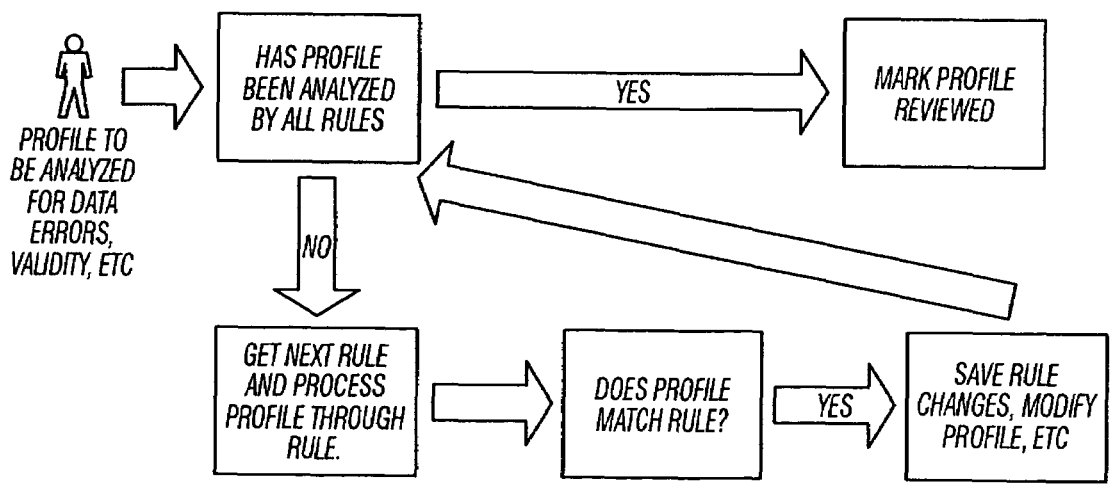
FIG. 18 is a flow for the rules engine according to the invention.

Reference is now made to FIG. 18 where a flow for the rules engine is shown. A rules engine is set up to process profile data automatically to search for common errors, problems, and faulty data. The rules engine is an expert system defined by an expert on the domain. Because the survey system is an open system, which allows free-text user input, as well as freely input numeric data, rules are put in place to monitor that data for validity automatically. This helps to automate the process of data cleaning, and allows an administrator to review large numbers of new profiles more efficiently. For instance, a user may enter data that is obviously bogus, such a having a salary that is too high, or too low for the currency type and country, such as '0.' Also, in some cases the rules engine may also automatically make changes to profile data.

The rules engine is implemented using a set of database queries, as shown in FIG. 19, and stored procedures that compare the profile to a set of predefined criteria, and that then take some action as a result. Each of these queries is run against each new profile input into the system by users. The results of the rules engine queries, including a list of changes determined by the rules, are stored in a table. The rules engine allows stored procedures to be set up which can check for any type of data error. Another example of a rule is if a user enters too many values for a particular FieldGroup, such as Skill. If a user has answered too many skills, chances are that some of those skills are not valid or the user is just playing with the system, and hence, the profile is invalidated, and not considered for profile searches and reports. A flag on the profile marks a profile as active or inactive. Inactive profiles are not used by any other part of the system for calculations, including comparisons in the survey engine, search goals, or reports. This way, data are cleaned and maintained as statistically valid. Many other flags are also set on a profile, and one skilled in the art can easily recognize that these flags are useful ways to gauge profiles' use in various aspects of the system. Rules in this form can also be used to modify existing profiles for data entry mistakes. For instance, a user may commonly enter a new open-text value for one FieldGroup that is truly a value for another FieldGroup. To keep data as valid as possible in an open system such as this, the rules engine moves the answer from one FieldGroup to another. One can easily see that a rules engine may be extended to any situation that applies to a significant number of profiles.

FIGS. 38 through 60 provide XML code and are intended as an exemplary and non-limiting code examples. A person skilled in the art could easily adapt these code examples as may be deemed necessary and remain within the intended scope of this invention.

Although the invention is described herein with reference to the preferred embodiment, one skilled in the art will readily appreciate that other applications may be substituted for those set forth herein without departing from the spirit and scope of the present invention. Accordingly, the invention should only be limited by the Claims included below.

The invention claimed is:

1. A computer implemented method for surveying a plurality of users with a sequence of questions that is automatically tailored per user to create a corresponding individualized compensation report, comprising the steps of:

creating, with a computer implemented survey engine, for each of said users a corresponding user profile containing a tailored sequence of questions and corresponding answers, said tailored sequence of questions directed towards determination of job information, career information, and potential profile matches responsive of a user profile and one or more affinity groups of said user;

creating, with said computer implemented survey engine, at least periodically, said one or more affinity groups for said users responsive of each of said corresponding user profiles, each of said one or more affinity groups having at least one user profile in an affinity group, said one or more affinity groups being created independent of the order in which said tailored sequence of questions is presented to a user;

associating, with said computer implemented survey engine, each user profile with at least one affinity group;

presenting to each user, with a collaborative filtering engine of said computer implemented survey engine, a sequence of questions from a source containing a plurality of different questions, said sequence of questions and order of each question in said sequence of questions being independently, asynchronously, and dynamically tailored for each and every user on an individual basis responsive to both an answer received from each individual user to a question previously presented to said individual user and a particular affinity group or combination of affinity groups to which a profile of said individual user is associated;

receiving answers from each user;

filtering said user profile, with a collaborative filtering engine of said computer implemented survey engine, wherein said filtering further comprises the application of a rules engine that comrpares said user profile to a set of predefined criteria;

modifying an answer if it is inconsistent with at least one of:
said user profile; and
said affinity group;

storing said user profile of said each user in a storage associated with said computer implemented survey engine;

wherein said affinity group comprises at least one of:
profession;
compensation;
compensation range;
experience;
experience range;
position; and
position range;

the steps repeated at least once more per user;

determining, with said collaborative filtering engine of said computer implemented survey engine, when no additional questions are to be presented to said individual based upon said individual's response to said sequence of questions;

capturing, with said collaborative filtering engine of said computer implemented survey engine, profile attributes comprising targeted compensation variables with regard to said individual user's profile responsive to an individual's answers to said sequence of questions;

generating a personalized compensation report, which includes job information, career information, compensation, and potential profile matches for a user responding to said tailored sequence of questions responsive of a request from said user to generate said report; and creating, by the computer implemented survey engine, when applicable new affinity groups as additional users respond to respective tailored sequence of questions.

2. The method of claim 1, wherein at least one particular subsequent question from said sequence of questions is presented because of at least one of:

popularity of said subsequent questions within said particular affinity group or combination of said affinity groups;

as a most frequently answered subsequent question within said particular affinity group or combination of said affinity groups; and as a most recently answered subsequent question within said particular affinity group or combination of said affinity groups.

3. The method of claim 1, wherein at least one question is capable of receiving an answer from said user that comprises an open text.

4. The method of claim 3, wherein said open text allows said user to add a new answer value for said question.

5. The method of claim 4, wherein said new answer is used as one of a plurality of possible answers to said question when said question is subsequently posed to a second user.

6. The method of claim 1, wherein a question comprises at least two possible answers.

7. The method of claim 6, wherein said user may select more than one answer to said question.

8. The method of claim 6, wherein said at least two possible answers are presented because of at least one of:

popularity of an answer within said particular affinity group or combination of said affinity groups;

as a most frequent answer within said particular affinity group or combination of said affinity groups; and as a most recent answer within said particular affinity group or combination of said affinity groups.

9. The method of claim 1, wherein said filtering step further comprises the step of:

modifying without user intervention an answer to said question based on at least one of:
predetermined criterion;
at least one filtering rule;
consistency with previously answered questions;
consistency with all answered questions; and
consistency with answers of said particular affinity group or combination of said affinity groups.

10. The method of claim 9, wherein said modification comprises at least one of omission of said answer, and tagging said user profile as inactive.

11. The method of claim 1, further comprising the steps of:
periodically creating a new affinity group by associating at least one user profile of said users to said new affinity group.

12. The method of claim 1, further comprising the step of:
providing a report.

13. The method of claim 12, wherein generation of said report is constrained by one or more constraints comprising at least one of:
an attribute of said user profile; and
a reporting goal.

14. The method of claim 13, wherein said goal comprises at least one of:
a profile attribute value;
a range of profile attribute values;
a Boolean value reflective of a set of values;
a Boolean value reflective of a set of non-values;
a date range;
a minimum count of matching profiles;
a maximum count of matching profiles;
a question filter;
an affinity filter; and
a match score threshold.

15. The method of claim 13, further comprising the step of:
weighting said constraints to provide a match score.

16. The method of claim 13, said step of providing said report comprising the steps of:
matching between at least a matchfield of said goal and a corresponding matchfield of at least one of an affinity group and a user profile, and
generating a match score.

17. The method of claim 16, further comprising the step of:
determining at least one best match from a plurality of possible matches.

18. The method of claim 17, further comprising the step of:
arranging matches by order of match score, said order being grouped to at least two levels of matches, based on said score.

19. The method of claim 16, said step of matching further comprising the step of:
providing an aggregated score for said matching step; and
weighting the importance of including said match in said report.

20. The method of claim 18, said step of matching further comprising the step of:
classifying each match score as one of:
deterministic to meeting said goal; and
non-deterministic to meeting said goal.

21. The method of claim 13, wherein said goal is any of:
a personal goal, wherein said personal goal is a result of a plurality of user inputs pertaining to personal aspirations; and
an external goal, wherein said external goal is a result of a plurality of arbitrary inputs.

22. The method of claim 21, wherein said aggregated information comprises statistical information.

23. The method of claim 21, wherein a report resulting from a personal goal comprises:
a comparison of a user having said user profile to at least one of:
a plurality of user profiles; and
an affinity group.

24. A computer implemented method for performing a compensation survey of a plurality of users with a sequence of questions that is automatically tailored per user to create a corresponding individualized compensation report, comprising the steps of:
creating, with a computer implemented survey engine, for each of said users a corresponding user profile containing a tailored sequence of questions and corresponding answers, said tailored sequence of questions directed towards determination of job information, career information, and potential profile matches responsive of a user profile and one or more affinity groups of said user;
creating, with said computer implemented survey engine, one or more affinity groups for said users responsive of said corresponding user profile, each of said one or more affinity groups having at least one user profile in an affinity group, said one or more affinity groups being created independent of the order in which said tailored sequence of questions is presented to a user;
associating, with said computer implemented survey engine, each user profile with at least one existing affinity group;
presenting to each user, with a collaborative filtering engine of said computer implemented survey engine, a sequence of questions from a source containing a plurality of different questions, said sequence of questions and order of each question in said sequence of questions being independently, asynchronously, and dynamically tailored for each and every user on an individual basis responsive to both an answer received from each individual user to a question previously presented to said individual user and a particular affinity group or combination of affinity groups with which a profile of said individual user is associated;
receiving answers from each user;
filtering said user profile, with a collaborative filtering engine of said computer implemented survey engine, wherein said filtering further comprises the application of a rules engine that compares said user profile to a set of predefined criteria;
modifying an answer if it is inconsistent with at least one of:
said user profile; and
said affinity group;
storing said user profile of said each user in a storage associated with said computer implemented survey engine;
wherein said affinity group comprises at least one of:
profession;
compensation;
compensation range;
experience;
experience range;
position; and
position range;
the steps repeated at least once more per user;
determining, with said collaborative filtering engine of said computer implemented survey engine, when no additional questions are to be presented to said individual based upon said individual's response to said sequence of questions;
capturing, with said collaborative filtering engine of said computer implemented survey engine, profile attributes comprising targeted compensation variables with regard to said individual user's profile responsive to an individual's answers to said sequence of questions;
generating a personalized compensation report, which includes job information, career information, compensation, and potential profile matches for a user responding to said tailored sequence of questions responsive of a request from said user to generate said report; and creating, by the computer implemented survey engine, when applicable new affinity groups as additional users respond to respective tailored sequence of questions.

25. The method of claim 24, further comprising the step of: providing a compensation report.

26. The method of claim 25, said compensation report is constrained by at least one of:
an attribute of said user profile; and
a reporting goal.

27. The method of claim 26, said goal comprising at least one of:
a desired compensation;
a desired range of compensation;
a desired geographic location;
a desired firm; and
a desired range of firms.

28. The method of claim 26, said goal comprising any of:
a personal goal, wherein said personal goal is a result of a plurality of user inputs pertaining to personal aspirations; and
an external goal, wherein said external goal is a result of a plurality of arbitrary inputs.

29. The method of claim 28, said personal goal comprising at least one of:
compensation;
compensation range;
salary;
salary range;
geographic location;
position; and
position range.

30. The method of claim 24, wherein a report displaying statistical information comprises at least one of:
average salary;
median compensation;
median salary;
salary percentile;
standard deviation;
trend;
profile count;
most frequent compensation; and
most frequent salary.

31. The method of claim 24, said compensation comprising at least one of:
annual salary;
monthly salary;
weekly salary;
hourly rate;
bonus;
tip;
benefits; and
vacation time.

32. A computer implemented method for surveying a plurality of users with a sequence of questions that is automatically tailored per user to create a corresponding individualized compensation report, comprising the steps of:

presenting to each user, with a collaborative filtering engine of a computer implemented survey engine, a tailored sequence of questions that is independently, asynchronous, and dynamically tailored for each and every user of the plurality of users on an individual basis from a source containing a plurality of different questions, each user's answer to each of said sequence of questions being stored in a corresponding user profile, said tailored sequence of questions directed towards determination of job information, career information, and potential profile matches responsive of a user profile and one or more affinity groups of said user;

determining periodically, with said computer implemented survey engine, an affinity of each of said corresponding user profile to compensation within one or more affinity groups, wherein each affinity group comprises a plurality of user profiles and wherein a user profile corresponds to at least one affinity group, said one or more affinity groups being created independent of the order in which said tailored sequence of questions is presented to a user;

receiving answers from each user;

filtering said user profile, with a collaborative filtering engine of said computer implemented survey engine, wherein said filtering further comprises the application of a rules engine that compares said user profile to a set of predefined criteria;

modifying an answer if it is inconsistent with at least one of:
said user profile; and
said affinity group;

wherein determining an appropriate next question for said sequence of questions to be presented to said user on an individual basis, said appropriate next question, and a specific order in which said sequence of said questions are presented to each said user, being determined on an individual, user-by-user basis based on at least a particular affinity group or combination of affinity groups to which said user profile is associated and an answer to a previously presented question;

storing said user profile of said each user in a storage associated with said computer implemented survey engine;

wherein said affinity group comprises at least one of:
profession;
compensation;
compensation range;
experience;
experience range;
position; and
position range;

the steps repeated at least once more per user;

determining, with said collaborative filtering engine of said computer implemented survey engine, when no additional questions are to be presented to said individual based upon said individual's response to said sequence of questions;

capturing, with said collaborative filtering engine of said computer implemented survey engine, profile attributes comprising targeted compensation variables with regard to said individual user's profile responsive to an individual's answers to said sequence of questions;

generating a personalized compensation report, which includes job information, career information, compensation, and potential profile matches for a user responding to said tailored sequence of questions responsive of a request from said user to generate said report; and creating, by the computer implemented survey engine, when applicable new affinity groups as additional users respond to respective tailored sequence of questions.

33. The method of claim 32, further comprising the steps of:
at least periodically checking all user profiles; and
attempting to generate at least an affinity group, wherein said affinity group comprises at least a user profile.

34. The method of claim 32, wherein a next question in said sequence of questions is determined based on at least one of:
popularity of said question within said particular affinity group or combination of said affinity groups;
a most frequently answered question within said particular affinity group or combination of said affinity groups; and
a most recently answered question within said particular affinity group or combination of said affinity groups; and
in relation to said question.

35. The method of claim 32, further comprising the step of:
querying any of a database of a plurality of user profiles and a database of a plurality of affinity groups for a statistical report.

36. The method of claim 35, wherein said statistical report comprises at least one of:
average salary;
median compensation;
median salary;
salary percentile;
standard deviation;
trend;
profile count;
most frequent compensation; and
most frequent salary.

* * * * *